US008797400B2

(12) United States Patent
Rinner et al.

(10) Patent No.: US 8,797,400 B2
(45) Date of Patent: Aug. 5, 2014

(54) APPARATUS AND METHOD FOR GENERATING AN OVERVIEW IMAGE OF A PLURALITY OF IMAGES USING AN ACCURACY INFORMATION

(75) Inventors: Bernhard Rinner, St. Radegund (AT); Markus Quaritsch, Grosspetersdorf (AT); Daniel Wischounig-Strucl, Klagenfurt (AT); Saeed Yahyanejad, Klagenfurt (AT)

(73) Assignee: Lakeside Labs GmbH, Klagenfurt (AT)

( * ) Notice: Subject to any disclaimer, the term of this patent is extended or adjusted under 35 U.S.C. 154(b) by 270 days.

(21) Appl. No.: 13/215,366

(22) Filed: Aug. 23, 2011

(65) Prior Publication Data

US 2012/0050524 A1  Mar. 1, 2012

Related U.S. Application Data

(60) Provisional application No. 61/377,604, filed on Aug. 27, 2010.

(30) Foreign Application Priority Data

Aug. 25, 2010 (EP) .................................... 10174053

(51) Int. Cl.
 *H04N 7/18* (2006.01)
(52) U.S. Cl.
 USPC ........................................................ 348/117
(58) Field of Classification Search
 CPC ................. G06T 3/40; G06T 7/0028
 See application file for complete search history.

(56) References Cited

U.S. PATENT DOCUMENTS

| 2004/0102876 | A1* | 5/2004 | Doane .............................. 701/9 |
| 2008/0158256 | A1* | 7/2008 | Russell et al. ................ 345/629 |
| 2008/0262724 | A1* | 10/2008 | Bodin et al. ................. 701/210 |
| 2010/0013927 | A1* | 1/2010 | Nixon ........................... 348/144 |
| 2011/0295569 | A1* | 12/2011 | Hamke et al. ..................... 703/2 |

OTHER PUBLICATIONS

Suzuki et al., "Vision Based Localization of a Small UAV for Generating a Large Mosaic Image," SICE Annual Conference 2010, Aug. 18-21, 2010, 5 pages, Taipei, Taiwan.
Kong et al., "Detecting Abandoned Objects With a Moving Camera," IEEE Transactions on Image Processing, vol. 19, No. 8, Aug. 2010, pp. 2201-2210.

(Continued)

*Primary Examiner* — Dave Czekaj
*Assistant Examiner* — MD Haque
(74) *Attorney, Agent, or Firm* — Keating & Bennett, LLP

(57) ABSTRACT

An apparatus for generating an overview image of a plurality of images includes an image preprocessor which preprocesses a new image by assigning the new image to a position in the overview image based on position information contained by meta-data of the new image. A storage unit stores a plurality of images of the overview image and provides the overview image for display. Further, the image processor receives accuracy information of the position information. The image processor determines an overlap region of the preprocessed new image and a stored image within the overview image based on the assigned positions of the preprocessed new image and of the stored image. Further, a controllable processing engine processes the preprocessed new image by re-adjusting the assigned position of the preprocessed new image based on comparing features of the overlap region of the preprocessed new image and the stored image. The controllable processing engine is controlled by accuracy information of the position information.

12 Claims, 15 Drawing Sheets

(56) References Cited

OTHER PUBLICATIONS

Han et al., "An Approach of Fast Mosaic for Serial Remote Sensing Images From UAV," Fourth International Conference on Fuzzy Systems and Knowledge Discovery (FSKD 2007), Aug. 1, 2007, 5 pages.
Zhan-Long et al., Image Registration Using Rotation Normalized Feature Points," Eighth International Conference on Intelligent Systems Design and Applications," 2008, pp. 237-241.
Steedly et al., "Efficiently Registering Video into Panoramic Mosaics," Tenth IEEE International Conference on Computer Vision, vol. 2, 2005, pp. 1300-1307, Los Alamitos, CA.
Bay et al., "Speeded-Up Robust Features (SURF)," Computer Vision and Image Understanding 110, 2008, pp. 346-359.
Kang et al., "Extracting View-Dependent Depth Maps From a Collection of Images," International Journal on Computer Vision, vol. 58, No. 2, 2004, pp. 139-163.
Cigla et al., "Multi-View Dense Depth Map Estimation," Proceedings of the 2nd International Conference on Immersive Telecommunications, 2009, pp. 1-6, Brussels, Belgium.
Szeliski, "Image Alignment and Stitching: A Tutorial1," Found. Trends. Comput. Graph, Vis, 2(1), 2006, 87 pages.
Shum et al., "Construction and Refinement of Panoramic Mosaics With Global and Local Alignment," Proceedings of Sixth International Conference on Computer Vision, 1998, 6 pages.
Furukawa et al., "Accurate Camera Calibration From Multi-View Stereo and Bundle Adjustment," Proceedings of IEEE Conference on Computer Vision and Pattern Recognition, No. 3, 2008, pp. 1-8, Hingham, MA.
Sibley et al., "Adaptive Relative Bundle Adjustment," Robotics Science and Systems (RSS), Jun. 2009, pp. 1-8, Seattle, WA.
Cheng et al., A Mosaic Approach for Remote Sensing Images Based on Wavelet Transform, WiCOM '08 Proceedings of the Fourth International Conference on Wireless Communications, Networking and Mobile Computing, 2008, pp. 1-4.
Lou et al., "Automatic Registration of Aerial Image Series Using Geometric Invariance," Proceedings of IEEE International Conference on Automation and Logistics, 2008, pp. 1198-1203, Qingdao, China.
Pesti et al., "Low-Cost Orthographic Imagery," in GIS '08: Proceedings of the 16th ACM SIGSPATIAL International Conference on Advances in Geographic Information Systems, 2008, pp, 1-8, New York, NY.
Jensen et al., "Low-Cost Multispectral Aerial Imaging Using Autonomous Runway-Free Small Flying Wing Vehicles," Geoscience and Remote Sensing Symposium, IGARSS, 2008, pp. 5:506-509.
Brown et al., "Near Real-Time Dissemination of Geo-Referenced Imagery by an Enterprise Server," Proceedings of 2006 GeoTec, Jun. 2006, Ottawa, Ontario, 15 pages.
Wang et al., "Free Image Registration and Mosaicing Based on Tin and Improved Szeliski Algorithm," The International Archives of the Photogrammetry, Remote Sensing and Spatial Information Sciences, Vo. XXXVII, Part B6b, 2008, pp. 145-150, Beijing, China.
Ladd et al., "Rectification, Georeferencing, and Mosaicking of Images Acquired With Remotely Operated Aerial Platforms," Proceedings of ASPRS 2006 Annual Conference, May 1-5, 2006, 10 pages, Reno, NV.
Huang et al., "Image Mosaicing for UAV Application," 2008 International Symposium on Knowledge Acquisition and Modeling, 2008, pp. 663-667, Washington, DC.
Zhu et al., "An Efficient Method for Geo-Referenced Video Mosaicing for Environmental Monitoring," Machine Vision and Applications, 2005, 16(4):203-216.
Roβmann, High-Detail Local Aerial Imaging Using Autonomous Drones, 12th AGILE International Conference on Geographic Information Science 2009, Hannover, Germany, pp. 1-8.
Schultz et al., "A System for Real-Time Generation of Geo-Referenced Terrain Models," SPIE Enabling Technologies for Law Enforcement, Nov. 5-8, 2000, Boston, MA, 8 pages.
Brown et al., "Recognising Panoramas," Proceedings of ICCV, 2003, 8 pages.
Wu et al., "A Contrast Among Experiments in Three Low-Altitude Unmanned Aerial Vehicles Photography: Security, Quality & Efficiency," The International Archives of the Photogrammetry, Remote Sensing and Spatial Information Sciences, vol. XXXVII. Part B1, 2008, pp. 1223-1228, Beijing, China.
AutoPano (http://www.autopano.net/).
PTGui Pro (http://www.ptgui.com/).
Quaritsch et al., "Collaborative Microdrones: Applications and Research Challenges," Proceedings of Second International Conference on Autonomic Computing and Communication Systems (Autonomics 2008), 7 pages, Sep. 2008, Turin, Italy.
Quaritsch et al., "Networked UAVS as Aerial Sensor Network for Disaster Management Applications," Elektrotechnik & Informationstechnik (2010), 127(3), pp. 56-63, Mar. 2010.
Rinner et al., "Apparatus and Method for Generating an Overview Image of a Plurality of Images Using a Reference Plane," U.S. Appl. No. 13/215,367, filed Aug. 23, 2011.

* cited by examiner

APPARATUS AND METHOD FOR GENERATING AN OVERVIEW IMAGE OF A PLURALITY OF IMAGES USING AN ACCURACY INFORMATION

BACKGROUND OF THE INVENTION

Embodiments according to the invention relating to the field of image processing and particularly an apparatus and a method for generating an overview image of the plurality of images.

Much research has been done in the area of mosaicking of aerial imagery and surveillance over the past years. Many approaches have been proposed ranging from using low altitude imagery of stationary cameras and UAVs (unmanned aerial vehicle) to higher altitudes imagery captured from balloons, airplanes, and satellites. High altitude imagery and on-ground mosaicking such as panoramic image construction are dealing with different challenges than low altitude imagery.

There has been a breakthrough regarding the seamless stitching in past years by exploiting robust feature extraction methods (see for example "Y. Zhan-long and G. Bao-long. Image registration using rotation normalized feature points. In ISDA '08: Proceedings of the 2008 Eighth International Conference on Intelligent Systems Design and Applications, pages 237-241, Washington, D.C., USA, 2008. IEEE Computer Society.", "D. Steedly, C. Pal, and R. Szeliski. Efficiently registering video into panoramic mosaicks. In Proceedings of the Tenth IEEE International Conference on Computer Vision, volume 2, pages 1300-1307, Los Alamitos, Calif., USA, 17-21 2005. IEEE Computer Society.", "H. Bay, A. Ess, T. Tuytelaars, and L. Van Gool. Speeded-Up Robust Features (SURF). Comput. Vis. Image Underst., 110(3):346-359, 2008"), depth-maps (see for example "S. B. Kang and R. Szeliski. Extracting view-dependent depth maps from a collection of images. Int. J. Comput. Vision, 58(2):139-163, 2004", "C. Cigla and A. A. Alatan. Multi-view dense depth map estimation. In IMMERSCOM '09: Proceedings of the 2nd International Conference on Immersive Telecommunications, pages 1-6, ICST, Brussels, Belgium, 2009. ICST Institute for Computer Sciences, Social-Informatics and Telecommunications Engineering"), 3D reconstruction of the scene, image fusion, and many other approaches (e.g. "R. Szeliski. Image alignment and stitching: a tutorial. Found. Trends. Comput. Graph. Vis., 2(1):1-104, 2006", "H.-Y. Shum and R. Szeliski. Construction and refinement of panoramic mosaicks with global and local alignment. In Proceedings of Sixth International Conference on Computer Vision, pages 953-956, 1998."). A SURF feature-based algorithm is for example described in "H. Bay, A. Ess, T. Tuytelaars, and L. Van Gool. Speeded-Up Robust Features (SURF). Comput. Vis. Image Underst., 110(3):346-359, 2008". Results look seamless at the stitching part but a drawback is that the transformation performed on the images leads to a distortion in scales and relative distances. Lines which are parallel in reality, are not parallel anymore in the stitched image. This type of error accumulates over multiple images if not compensated. Such a traditional feature-based approach is difficult for some applications. For example, the generation of a geo-referenced image is hardly possible due to the scale and angle distortions as well as the error propagation over multiple images. Other stiching algorithms are shown in "H.-Y. Shum and R. Szeliski. Construction and refinement of panoramic mosaicks with global and local alignment. In Proceedings of Sixth International Conference on Computer Vision, pages 953-956, 1998", "Y. Furukawa and J. Ponce. Accurate Camera Calibration from Multi-View Stereo and Bundle Adjustment. In Proceedings of IEEE Conference on Computer Vision and Pattern Recognition, number 3, pages 1-8, Hingham, Mass., USA, 2008" or "G. Sibley, C. Mei, I. Reid, and P. Newman. Adaptive relative bundle adjustment. In Robotics Science and Systems (RSS), Seattle, USA, June 2009".

A challenge of low altitude imagery and mosaicking for surveillance purposes is finding an appropriate balance between seamless stitching and geo-referencing under consideration of processing time and other resources. The scale difference as a result of different flying altitude resulted in several stitching errors. In other words, significant stitching errors induced by scale differences among images may be visible. Similar objects may have different sizes, and there may be a disparity in horizontal and vertical stitching. A similar error may occur by inaccurate camera position or rotation. In other words, stitching disparities may be caused by inaccurate camera angle or position.

Many approaches have been proposed to tackle these problems. Examples include the wavelet-based stitching "C. Yuanhang, H. Xiaowei, and X. Dingyu. A mosaick approach for remote sensing images based on wavelet transform. In WiCOM '08: Proceedings of the Fourth International Conference on Wireless Communications, Networking and Mobile Computing, pages 1-4, 2008", image registering in binary domains "X. Han, H. Zhao, L. Yan, and S. Yang. An approach of fast mosaick for serial remote sensing images from UAV. In FSKD '07: Proceedings of the Fourth International Conference on Fuzzy Systems and Knowledge Discovery, pages 11-15, Washington, D.C., USA, 2007. IEEE Computer Society", automatic mosaicking by 3D-reconstruction and epipolar geometry "L. Lou, F.-M. Zhang, C. Xu, F. Li, and M.-G. Xue. Automatic registration of aerial image series using geometric invariance. In Proceedings of IEEE International Conference on Automation and Logistics, pages 1198-1203, 2008", exploiting known ground reference points for distortion correction "P. Pesti, J. Elson, J. Howell, D. Steedly, and M. Uyttendaele. Low-cost orthographic imagery. In GIS '08: Proceedings of the 16th ACM SIGSPATIAL international conference on Advances in geographic information systems, pages 1-8, New York, N.Y., USA, 2008. ACM", IMU-based multi-spectral image correction "A. Jensen, M. Baumann, and Y. Chen. Low-cost multispectral aerial imaging using autonomous runway-free small flying wing vehicles. Geoscience and Remote Sensing Symposium, IGARSS, 5:506-509, 2008", combining GPS, IMU and video sensors for distortion correction and geo-referencing "A. Brown, C. Gilbert, H. Holland, and Y. Lu. Near Real-Time Dissemination of Geo-Referenced Imagery by an Enterprise Server. In Proceedings of 2006 GeoTec Event, Ottawa, Ontario, Canada, June 2006" and perspective correction by projective transformation "W. H. WANG Yue, WU Yun-dong. Free image registration and mosaicking based on tin and improved szeliski algorithm. In Proceedings of ISPRS Congress, volume XXXVII, Beijing, 2008". Some of these approaches are considering higher altitude "A. Brown, C. Gilbert, H. Holland, and Y. Lu. Near Real-Time Dissemination of Geo-Referenced Imagery by an Enterprise Server. In Proceedings of 2006 GeoTec Event, Ottawa, Ontario, Canada, June 2006", "X. Han, H. Zhao, L. Yan, and S. Yang. An approach of fast mosaick for serial remote sensing images from UAV. In FSKD '07: Proceedings of the Fourth International Conference on Fuzzy Systems and Knowledge Discovery, pages 11-15, Washington, D.C., USA, 2007. IEEE Computer Society.", "L. Lou, F.-M. Zhang, C. Xu, F. Li, and M.-G. Xue. Automatic registration of aerial image series using geometric invariance. In Proceedings of IEEE International Conference on Automation and Logistics, pages 1198-1203, 2008", P. Pesti, J. Elson, J. Howell, D. Steedly, and M. Uyttendaele. Low-cost orthographic imagery. In GIS '08: Proceedings of the 16th ACM SIGSPATIAL international conference on Advances in geographic information systems, pages 1-8, New York, N.Y., USA, 2008. ACM", "W. H. WANG Yue, WU Yun-dong. Free image registration and mosaicking based on tin and improved szeliski algorithm. In Proceedings of ISPRS Congress, volume XXXVII, Beijing, 2008", while others are using different types of UAVs such as small fixed wing aircrafts "G. B. Ladd, A. Nagchaudhuri, M. Mitra, T. J. Earl, and G. L. Bland. Rectification, geo-referencing, and mosaicking of images acquired with remotely operated aerial platforms. In Proceedings of ASPRS 2006 Annual Conference, page 10 pp., Reno, Nev., USA, May 2006", "A. Jensen, M. Baumann, and Y. Chen. Low-cost multispectral aerial imaging using autonomous runway-free small flying wing vehicles. Geoscience and Remote Sensing Symposium, IGARSS, 5:506-509, 2008.", "Y. Huang, J. Li, and N. Fan. Image Mosaicking for UAV Application. In KAM '08: Proceedings of the 2008 International Symposium on Knowledge Acquisition and Modeling, pages 663-667, Washington, D.C., USA, 2008. IEEE Computer Society". These aircrafts show less geo-referencing accuracy caused by higher speed and degree of tilting (higher amount of roll and pitch). "Z. Zhu, E. M. Riseman, A. R. Hanson, and H. J. Schultz. An efficient method for geo-referenced video mosaicking for environmental monitoring. Mach. Vis. Appl., 16(4):203-216, 2005" performed an aerial imagery mosaicking without any 3D reconstruction or complex global registration. That approach uses the video stream which was taken from an airplane. "Y. Huang, J. Li, and N. Fan. Image Mosaicking for UAV Application. In KAM '08: Proceedings of the 2008 International Symposium on Knowledge Acquisition and Modeling, pages 663-667, Washington, D.C., USA, 2008. IEEE Computer Society" performed a seamless feature-based mosaicking using a small fixed-wing UAV. "J. RoBmann and M. Rast. High-detail local aerial imaging using autonomous drones. In Proceedings of 12th AGILE International Conference on Geographic Information Science: Advances in GlScience, Hannover, Germany, June 2009". also used small-scale quadrocopters. The mosaicking results are seamless but lacking geo-referencing.

"Howard Schultz, Allen R. Hanson, Edward M. Riseman, Frank Stolle, Zhigang Zhu, Christopher D. Hayward, Dana Slaymaker. A System for Real-time Generation of Geo-referenced Terrain Models. SPIE Enabling Technologies for Law Enforcement Boston, Mass., Nov. 5-8, 2000" and "Zhigang Zhu, Edward M. Riseman, Allen R. Hanson, Howard Schultz. An efficient method for geo-referenced video mosaicking for environmental monitoring. Machine Vision and Applications (2005) 16(4): 203-216" describes a system for generating 3D structures from aerial images useing laser sensor to precisely measure the elevations. For this, a larger airplane with two camera systems may be used.

In "M. Brown and D. G. Lowe. Recognising Panoramas. In Proc. ICCV 2003" a purely image-based mosaicking is shown. It describes an automatic approach for feature (using SIFT) and image matching by assuming that the camera rotates about its optical center.

"WU Yundong, ZHANG Qiangb, LIU Shaoqind. A CONTRAST AMONG EXPERIMENTS IN THREE LOW-ALTITUDE UNMANNED AERIAL VEHICLES PHOTOGRAPHY: SECURITY, QUALITY & EFFICIENCY. The International Archives of the Photogrammetry, Remote Sensing and Spatial Information Sciences. Vol. XXXVII. Part B1. Beijing 2008" describes experiments for covering larger areas with UAVs and generating an overview image.

There are some software tools for image stitching available. However, they have several restrictions/assumptions (camera position and orientation, distance to objects etc.). For example, AutoPano (http://www.autopano.net/) takes a set of images and generates an overview (mosaick) which is visually most appealing. AutoPano stitches for beauty, at all areas where are less images or less overlap the distortions are still high with AutoPano. Another tool is PTGui Pro (http://www.ptgui.com/). PTGui stitches most panoramas fully automatically, but at the same time provides full manual control over every single parameter.

SUMMARY

According to an embodiment, an apparatus for generating an overview image of a plurality of images, wherein each image of the plurality of images comprises associated meta-data, may have: an image preprocessor configured to preprocess a new image by assigning the new image to a position in the overview image based on a position information comprised by the meta-data of the new image; a storage unit configured to store a plurality of preprocessed or processed images of the overview image, wherein each preprocessed or processed image of the plurality of preprocessed or processed images is assigned to a position in the overview image, wherein the storage unit is configured to provide the overview image containing the plurality of preprocessed or processed images at their assigned positions for displaying; and an image processor comprising an accuracy information input for receiving an accuracy information of the position information and a controllable processing engine, wherein the image processor is configured to determine an overlap region of the preprocessed new image and a stored preprocessed or stored processed image within the overview image based on the assigned position of the preprocessed new image and the assigned position of the stored preprocessed or stored processed image, wherein the controllable processing engine is configured to process the preprocessed new image by re-adjusting the assigned position of the preprocessed new image based on a comparison of features of the overlap region of the preprocessed image and features of the overlap region of the stored preprocessed or stored processed image, wherein the controllable processing engine is controlled by an accuracy information of the position information received by the accuracy information input, so that a maximal re-adjustment of the assigned position of the preprocessed new image is limited based on the received accuracy information of the position information, wherein the storage unit is configured to add the processed new image with the re-adjusted assigned position to the plurality of preprocessed or processed images.

According to another embodiment, an unmanned aerial vehicle may have: a camera configured to take an image during a flight of the unmanned aerial vehicle; a sensor system configured to determine a position of the unmanned aerial vehicle at a time the image is taken to acquire a position information associated to the taken image, wherein the sensor system is configured to determine a yaw, a nick or a roll of the unmanned aerial vehicle at a time, the image is taken, to acquire a yaw information, a nick information or a roll information associated to the taken image; an accuracy determiner configured to determine an accuracy of the determination of the position of the unmanned aerial vehicle to acquire an accuracy information associated to the determined position information, wherein the accuracy determiner is configured to determine an accuracy of the determination of the yaw, the nick or the roll of the unmanned aerial vehicle to acquire an accuracy information associated to the determined yaw information, the nick information or the roll information; a transmitter configured to transmit the taken image together with associated meta-data containing the position information of the taken image and the accuracy information of the position information, wherein the meta-data further contains the yaw information, the nick information, the roll information, the accuracy information of the yaw information, the accuracy information of the nick information or the accuracy information of the roll information.

According to another embodiment, a method for providing an image together with associated meta-data taken by an unmanned aerial vehicle may have the steps of: taking an image during a flight of the unmanned aerial vehicle; determining a position of the unmanned aerial vehicle at a time the image is taken to acquire a position information associated to the taken image; determining a yaw, a nick or a roll of the unmanned aerial vehicle at a time, the image is taken, to acquire a yaw information, a nick information or a roll information associated to the taken image; determining an accuracy of the determination of the position of the unmanned aerial vehicle to acquire an accuracy information associated to the determined position information; determining an accuracy of the determination of the yaw, the nick or the roll of the unmanned aerial vehicle to acquire an accuracy information associated to the determined yaw information, the nick information or the roll information; transmitting the taken image together with associated meta-data containing the position information of the taken image and the accuracy information of the position information, wherein the meta-data further contains the yaw information, the nick information, the roll information, the accuracy information of the yaw information, the accuracy information of the nick information or the accuracy information of the roll information.

According to another embodiment, a method for generating an overview image of a plurality of images, wherein each image of the plurality of images comprises associated meta-data, may have the steps of: preprocessing a new image by assigning the new image to a position in the overview image based on a position information comprised by the meta-data of the new image; storing a plurality of preprocessed or processed images of the overview image, wherein each preprocessed or processed image of the plurality of preprocessed or processed images comprises an assigned position in the overview image; determining an overlap region of the preprocessed new image and a stored preprocessed or stored processed image within the overview image based on the assigned position of the preprocessed new image and the assigned position of the stored preprocessed or stored processed image; processing the preprocessed image by re-adjusting the assigned position of the preprocessed new image based on a comparison of features of the overlap region of the preprocessed new image and the stored preprocessed or stored processed image, wherein a maximal re-adjustment of the assigned position of the preprocessed new image is limited based on an accuracy information of the position information; adding the processed new image with the re-adjusted assigned position to the plurality of preprocessed or processed images; and providing the overview image containing the plurality of preprocessed or processed images at their assigned positions for displaying.

Another embodiment may have a computer program with a program code for performing the method for providing an image together with associated meta-data taken by an unmanned aerial vehicle, which method may have the steps of: taking an image during a flight of the unmanned aerial vehicle; determining a position of the unmanned aerial vehicle at a time the image is taken to acquire a position information associated to the taken image; determining a yaw, a nick or a roll of the unmanned aerial vehicle at a time, the image is taken, to acquire a yaw information, a nick information or a roll information associated to the taken image; determining an accuracy of the determination of the position of the unmanned aerial vehicle to acquire an accuracy information associated to the determined position information; determining an accuracy of the determination of the yaw, the nick or the roll of the unmanned aerial vehicle to acquire an accuracy information associated to the determined yaw information, the nick information or the roll information; transmitting the taken image together with associated meta-data containing the position information of the taken image and the accuracy information of the position information, wherein the meta-data further contains the yaw information, the nick information, the roll information, the accuracy information of the yaw information, the accuracy information of the nick information or the accuracy information of the roll information, when the computer program runs on a computer or micro controller.

Another embodiment may have a computer program with a program code for performing the for generating an overview image of a plurality of images, wherein each image of the plurality of images comprises associated meta-data, which method may have the steps of: preprocessing a new image by assigning the new image to a position in the overview image based on a position information comprised by the meta-data of the new image; storing a plurality of preprocessed or processed images of the overview image, wherein each preprocessed or processed image of the plurality of preprocessed or processed images comprises an assigned position in the overview image; determining an overlap region of the preprocessed new image and a stored preprocessed or stored processed image within the overview image based on the assigned position of the preprocessed new image and the assigned position of the stored preprocessed or stored processed image; processing the preprocessed image by re-adjusting the assigned position of the preprocessed new image based on a comparison of features of the overlap region of the preprocessed new image and the stored preprocessed or stored processed image, wherein a maximal re-adjustment of the assigned position of the preprocessed new image is limited based on an accuracy information of the position information; adding the processed new image with the re-adjusted assigned position to the plurality of preprocessed or processed images; and providing the overview image containing the plurality of preprocessed or processed images at their assigned positions for displaying, when the computer program runs on a computer or micro controller.

An embodiment of the invention provides an apparatus for generating an overview image of a plurality of images. Each image of the plurality of images comprises associated meta-data. The apparatus comprises an image preprocessor, a storage unit and an image processor. The image preprocessor is configured to preprocess a new image by assigning the new image to a position in the overview image based on a position information contained by meta-data of the new image. Further, the storage unit is configured to store a plurality of preprocessed or processed images. Each preprocessed or processed image of the plurality of preprocessed or processed image is assigned to a position in the overview image. Additionally, the storage unit is configured to provide the overview image containing the plurality of preprocessed or processed images at their assigned positions for displaying. Further, the image processor comprises an accuracy information input for receiving an accuracy information of the position information and a controllable processing engine. The image processor is configured to determine an overlap region of the preprocessed new image and a stored preprocessed or stored processed image within the overview image based on the assigned position of the new image and the assigned position of the stored preprocessed or stored processed image. Additionally, the controllable processing engine is configured to process the new image by re-adjusting the assigned position of the new image based on a comparison of features of the overlap region of the new image and the stored preprocessed or stored processed image. For this, the controllable processing engine is controlled by the accuracy information of the position information received by the accuracy information input, so that a maximal re-adjustment of the assigned position of the new image is limited based on the received accuracy information of the position information.

Since the re-adjustment of the assigned position of the new image is limited based on the accuracy information of the position information, distances between points in different images can be preserved more accurate than with an image-based stitching algorithm without limitation. In this way, a position-based generation of an overview image can be refined by an image-based re-adjustment without the risk of losing completely the reference to real distances (the geo-reference) in the overview image. Further, a very fast generation of an overview image containing the new image may be possible, since a position of the new image in the overview image is already assigned after preprocessing. The processing of the new image for refining the overview image may be done afterwards for improving the smoothness of transitions from the new image to overlapping images for obtaining a nice-looking picture.

Another embodiment of the invention provides an apparatus for generating an overview image of a plurality of images comprising a storage unit and an image processor. The storage unit is configured to store a plurality of processed images of the overview image. Each image of the plurality of images is assigned to a position in the overview image. Further, the storage unit is configured to provide the overview image containing the plurality of processed images at their assigned positions for displaying. The image processor is configured to determine feature points of a new image and configured to compare the determined feature points of the new image with feature points of a stored processed image to identify common feature points and to obtain 3-dimensional positions of the common feature points. Further, the image processor is configured to determine common feature points located within a predefined maximum distance of relevance to a reference plane based on the 3-dimensional positions of the common feature points to identify relevant common feature points. Additionally, the image processor is configured to process the new image by assigning the new image to a position in the overview image based on a comparison of an image information of each relevant common feature point of the new image with an image information of each corresponding relevant common feature point of the stored image without considering common feature points located beyond the predefined maximum distance to the reference plane. Further, the storage unit is configured to add the new processed image with the assigned position to the plurality of images of the overview image.

Since only feature points located in or near the reference plane are considered for determining the position of the new image in the overview image, errors caused by considering reference points at largely different elevations can be reduced and therefore the distance between points in different images can be preserved more accurate and/or the smoothness of the transition between images can be increased to obtain a nice-looking overview image.

Some embodiments according to the invention relate to an unmanned aerial vehicle comprising a camera, a sensor system, an accuracy determiner and a transmitter. The camera is configured to take an image during a flight of the unmanned aerial vehicle. The sensor system is configured to determine a position of the unmanned aerial vehicle at the time the image is taken to obtain a position information associated to the taken image. Further, the accuracy determiner is configured to determine an accuracy of the determination of the position of the unmanned aerial vehicle to obtain an accuracy information associated to the determined position information. The transmitter is configured to transmit the taken image together with associated meta-data containing the position information of the taken image and the accuracy information of the position information.

By determining and transmitting an information of the accuracy of the position information, the accuracy information can be taken into account, for example, for the generation of an overview image containing the taken image later on.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
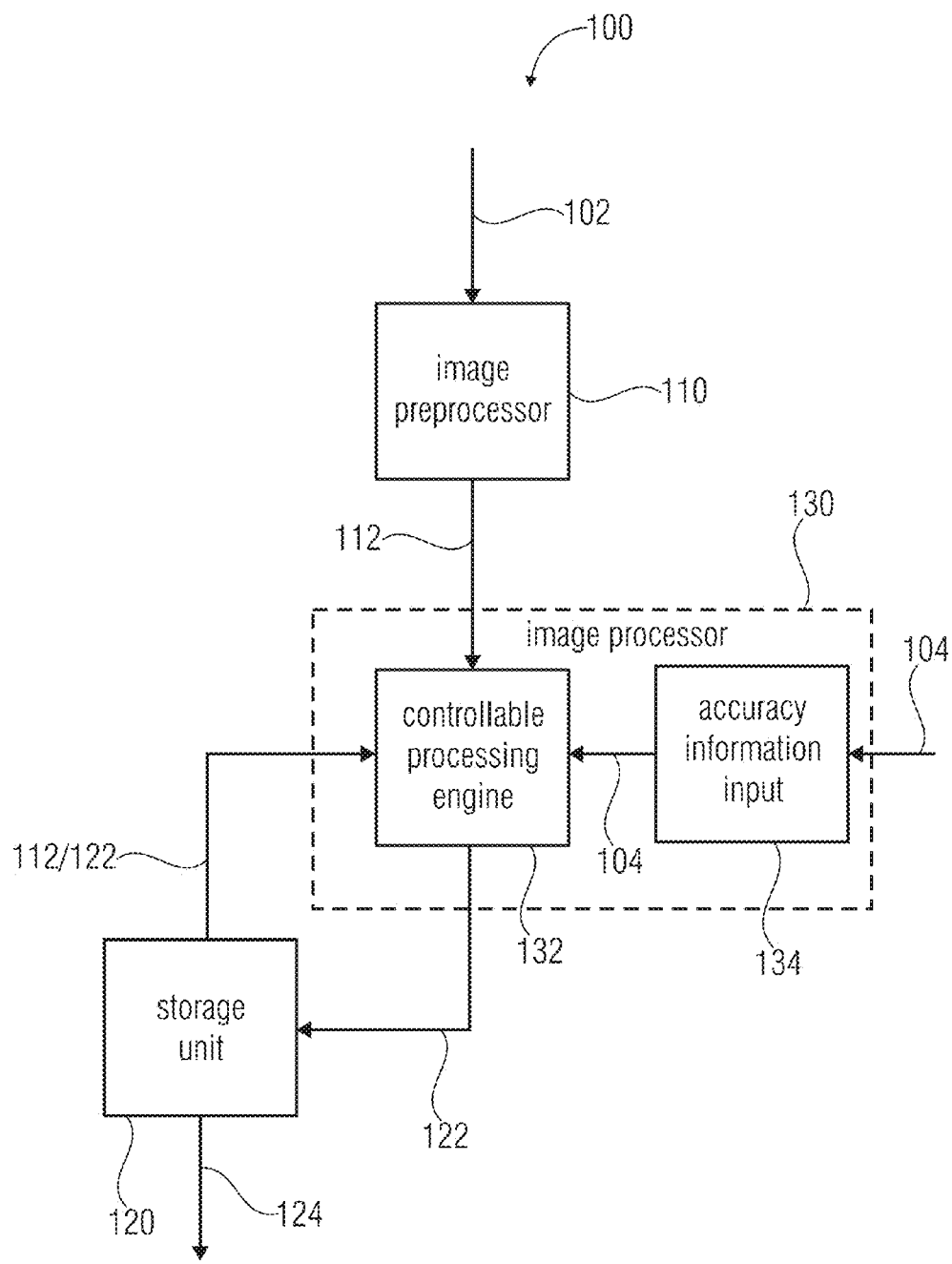
FIG. 1 is a block diagram of an apparatus for generating an overview image of a plurality of images.

In the following, the same reference numerals are partly used for objects and functional units having the same or similar functional properties and the description thereof with regard to a figure shall apply also to other figures in order to reduce redundancy in the description of the embodiments.

FIG. 1 shows a block diagram of an apparatus 100 for generating an overview image 124 of a plurality of images according to an embodiment of the invention. Each image of the plurality of images comprises associated meta-data. The apparatus 100 comprises an image preprocessor 110, a storage unit 120 and an image processor 130. The image preprocessor 110 is connected to the image processor 130 and the image processor 130 is connected to the storage unit 120. The image preprocessor 110 preprocesses a new image 102 by assigning the new image 102 to a position in the overview image 124 based on a position information contained by the meta-data of the new image 102. Further, the storage unit 120 stores a plurality of preprocessed or processed images 112, 122, wherein each preprocessed or processed image 112, 122 of the plurality of preprocessed or processed images comprises an assigned position in the overview image 124. Additionally, the storage unit 120 is able to provide the overview image 124 containing the plurality of preprocessed or processed images at their assigned positions for displaying. The image processor 130 comprises an accuracy information input 134 for receiving an accuracy information 104 of the position information and a controllable processing engine 132. The accuracy information input 134 is connected to the controllable processing engine 132 and the controllable processing engine 132 is connected to the image preprocessor 110 and the storage unit 120. Further, the image processor 130 determines an overlap region of the preprocessed new image 112 and a stored preprocessed or stored processed image 112, 122 within the overview image 124 based on the assigned position of the new image 112 and the assigned position of the stored preprocessed or stored processed image 112, 122. The controllable processing engine 132 processes the preprocessed new image 112 by re-adjusting the assigned position of the preprocessed new image 112 based on a comparison of features of the overlap region of the preprocessed new image 112 and features of the overlap region of the stored preprocessed or stored processed image 112, 122. For this, the controllable processing engine is controlled by the accuracy information of the position information 104 received by the accuracy information input 134, so that a maximal re-adjustment of the assigned position of the preprocessed new image 112 is limited based on the received accuracy information 104 of the position information. Additionally, the storage unit 120 adds the processed new image 122 with the re-adjusted assigned position to the plurality of preprocessed or processed images of the overview image 124.

Since the re-adjustment of the assigned position of the preprocessed new image 112 is limited based on the received accuracy information 104 of the position information, the image-based processing of the preprocessed image 112 and the overlapping stored preprocessed or processed image 112, 122 preserves the connection of the distances of points in different images of the overview image 124 to the distances in reality at least with the accuracy of the position information contained by the meta-data. In this way, a position-based alignment of images in an overview image can be refined by an image-based alignment without losing the whole information about distances between points in the overview image. So, the accuracy of preserving the distance in the overview image can be significantly increased. Further, the smoothness of transitions of images in the overview image may be increased in comparison to only position-based or orientation-based alignments.

The new image 102 may be provided, for example, from a storage unit (e.g. a memory card of a digital camera or a storage device of a computer) or may be transmitted online from an unmanned aerial vehicle or an airplane taking images of an area.

Each image comprises associated meta data, which is stored together with the image or transmitted together with the image, for example. The meta-data contains a position information of the image, but may also contain further data (e.g. roll, pitch, yaw of a camera, the image is taken with). The position information may be, for example, a GPS position (global positioning system) or another position definition indicating a relative or an absolute position allowing to assign the new image to a position in the overview image.

The storage unit 120 stores a plurality of preprocessed or processed images of the overview image. In this connection, a preprocessed image 112 is an image comprising a position in the overview image assigned by the image preprocessor 110 before the assigned position is re-adjusted by the image processor 130. Consequently, a processed image 122 is an image after re-adjustment of the assigned position by the image processor 130.

For example, a preprocessed image 112 may be stored directly after preprocessing by the storage unit 120 to enable the storage unit 120 to provide an overview image containing the new image very fast. Afterwards, the new image may be processed by the image processor 130 to refine the assigned position of the preprocessed new image 112. Alternatively, the preprocessed image 112 is directly processed by the image processor 130 without storing the preprocessed image 112.

The storage unit 120 is able to provide the overview image 124 to a display (which may be an optional part of the apparatus 100).

The image processor 130 determines an overlap region of the preprocessed new image 112 and a stored preprocessed or stored processed image 122. Although it may be possible that none of the already stored preprocessed or stored processed images 112, 122 overlap with the preprocessed new image 112, it is getting more likely when the number of images already contained by the overview image stored by the storage unit 120 increases. If a preprocessed new image 112 does not comprise an overlap region with any of the other images 112, 122 of the overview image 124 already stored by the storage unit 120, the preprocessed new image 112 may be stored directly by the storage unit 120.

The controllable processing engine 132 processes the preprocessed new image 112 by re-adjusting the assigned position, wherein the re-adjustment is limited based on the accuracy information 104 of the position information. The accuracy information 104 of the position information may be the same for all images, may be updated periodically or depending on a change of the accuracy of the position information. Alternatively, each image may comprise an individual accuracy information 104 of the individual position information contained by the associated meta-data. For example, if the images are taken by an unmanned aerial vehicle, the unmanned aerial vehicle may determine a position and an accuracy of the position at the time a picture is taken and transmits this information together with the image to the apparatus 100. Alternatively, the unmanned aerial vehicle may transmit accuracy information periodically or when the accuracy changes more than a predefined threshold. In another example, the accuracy of the position information is known and stored by a storage device, which provides the accuracy information of the position information to the accuracy information input 134. By limiting the re-adjustment of the assigned position by the accuracy information 104 of the position information it may be guaranteed that the loss of accuracy of the connection between distances of points in the overview image to distances in reality is not larger than the already existent inaccuracy due to the limited accuracy of the position information.

The re-adjustment is done based on a comparison of features of the overlap region of the preprocessed new image 112 and the stored preprocessed or stored processed image 112, 122. For example, the features of the overlap region may be common feature points identified in the overlap regions of both images or areas around feature points of the overlap regions of images. Although only a re-adjustment of the assigned position of the preprocessed new image 112 is mentioned, at the same time a re-adjustment (or a further re-adjustment) of the assigned position of the stored preprocessed or stored processed image 112, 122 may be done. In this case, the re-adjustment of the assigned position of the stored preprocessed or stored processed image 112, 122 may also be limited by an accuracy information of the position information of the stored preprocessed or stored processed image 112, 122.

The image preprocessor 110, the storage unit 120 and the image processor 130 may be, for example, independent hardware units or part of a computer or micro controller as well as a computer program or a software product configured to run on a computer or micro controller.

Additionally to the assignment of the new image 102 to the position in the overview image 124, the image preprocessor 110 may preprocess the new image 102 by considering a roll information, a pitch information and/or a yaw information to correct an orientation and/or a perspective distortion of the new image 102. For example, the new image 102 may be taken from an unmanned aerial vehicle. Such an unmanned aerial vehicle is usually small and therefore susceptible for wind and other environmental influences. Therefore, sensors (IMU, inertial measurement unit) of the unmanned aerial vehicle may determine a roll, a pitch and a yaw of the unmanned aerial vehicle (or of the camera) at the time an image is taken and add a roll information, a pitch information and/or a yaw information to the meta-data of the image. The image preprocessor 110 can use this information contained by the meta-data to compensate an orientation offset or a perspective distortion of the new image 102.

Further, the controllable processing engine 132 may process the preprocessed new image 112 by re-adjusting an orientation or a perspective distortion based on the comparison of the features of the overlap region. In this case, the controllable process engine may be further controlled by accuracy information 104 of the roll information, the pitch information or the yaw information received by the accuracy information input 134, so that the maximal re-adjustment of the assigned position of the preprocessed new image 112 and a maximal re-adjustment of the orientation or the perspective distortion is limited based on the accuracy information 104 of the roll information, the pitch information or the yaw information. In other words, the maximal re-adjustment of the assigned position may be limited by the accuracy of the determination of the position, which may also depend on the accuracy of the roll, the pitch and/or the yaw. In this way, for example, the position and orientation of the camera, the image was taken with, an unmanned aerial vehicle or another vehicle taking that new image may be considered during re-adjustment of the assigned position of the new image. Additionally, also an orientation or a perspective distortion may be re-adjusted and limited based on the accuracy information 104.

Figure 3:
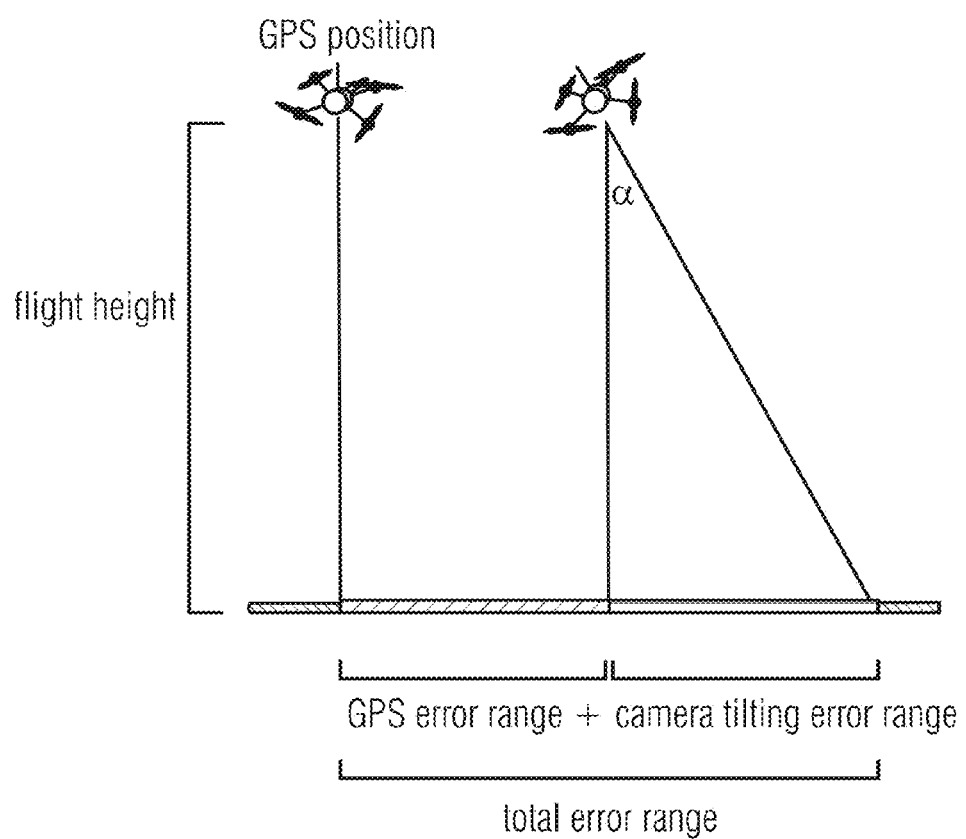
FIG. 3 is a schematic illustration of position and orientation errors of unmanned aerial vehicles.

FIG. 3 shows an example for position and orientation errors, which can be taken into account for the re-adjustment of the position of the new image 112. It indicates the GPS error range (the real position is in this range) and the tilting error range. The sum of these two errors may give the total positioning error, which may be represented by the accuracy information of the position information. It shows an example for a maximum position error (accuracy of the position information), if the new image 102 is taken by an unmanned aerial vehicle.

In some embodiments according to the invention, the image preprocessor 110 may receive successively a plurality of new images 102 and preprocesses each received new image 102. Further, the storage unit 120 may store each preprocessed new image 112 and provides an updated overview image 124 after storing a predefined number of preprocessed new images 112. The predefined number of images may be one, so that the storage unit 120 may provide an updated overview image after storing each preprocessed new image 112. Alternatively, the predefined number of preprocessed images may be higher than one, so that the overview image is updated periodically after storing the predefined number of preprocessed images. In this way, an overview image 124 can be provided very fast, since the position and/or orientation-based preprocessing can be done significantly faster than the image-based processing by the image processor 130. For example, the apparatus 100 may receive continuously new images from an unmanned aerial vehicle, which can be provided for displaying in an overview image directly after preprocessing. A re-adjustment of the assigned position by the image processor 130 for refinement of the transition between overlapping images may be done later on.

Figure 2:
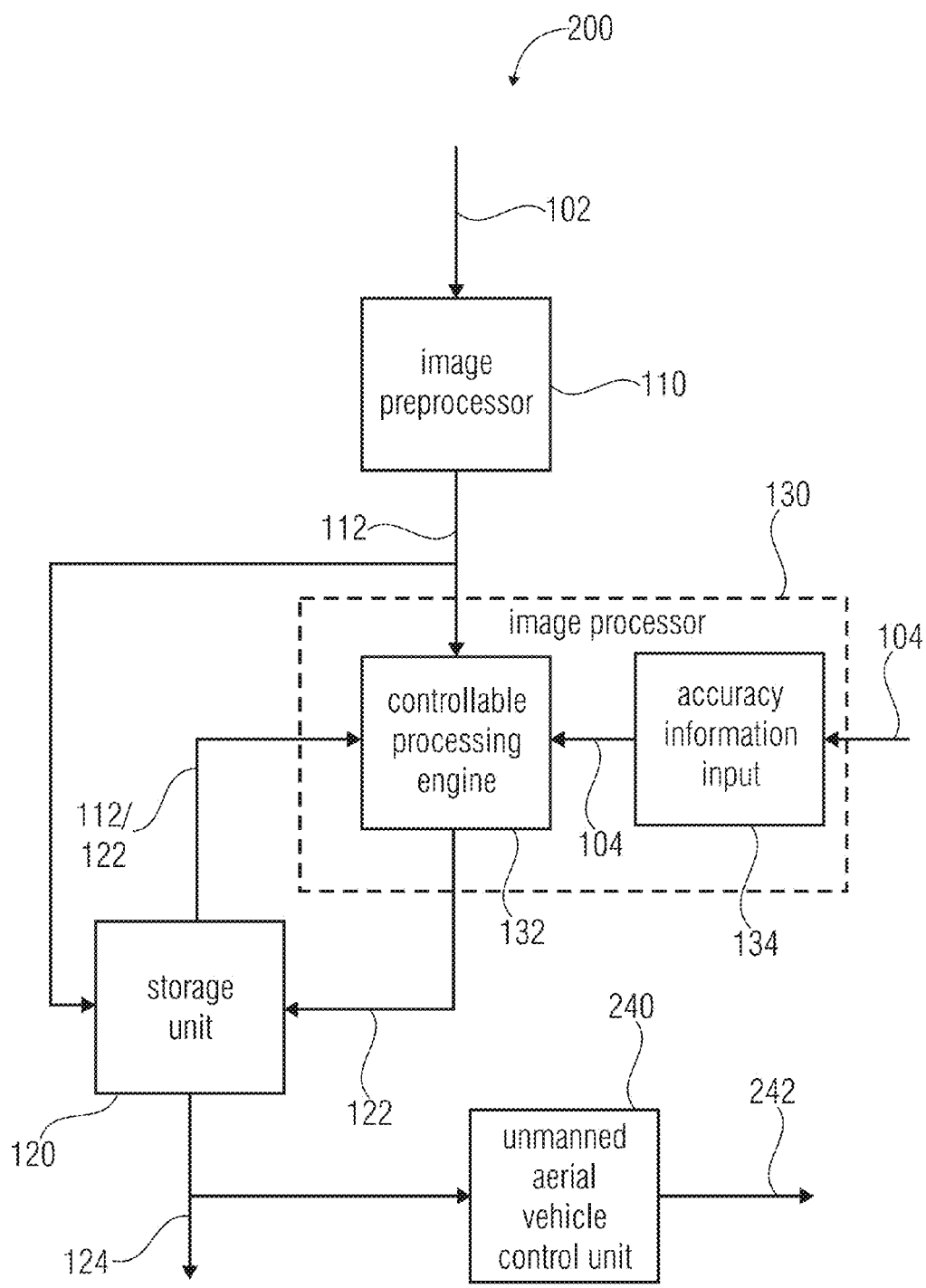
FIG. 2 is a block diagram of an apparatus for generating an overview image of a plurality of images.

FIG. 2 shows a block diagram of an apparatus 200 for generating an overview image 124 of a plurality of images according to an embodiment of the invention. The apparatus 200 is similar to the apparatus shown in FIG. 1, but comprises additionally an optional unmanned aerial vehicle control unit 240 connected to the storage unit 120 and the image preprocessor 110 is connected to the storage unit 120.

In this way, the storage unit 120 may add the preprocessed new image 112 with the assigned position to the plurality of preprocessed or processed images. Further, the storage unit 120 may provide the overview image 124 containing the preprocessed new image 112 at the assigned position for displaying before the preprocessed new image 112 is processed by the image processor 130 as already mentioned above. In this way, an overview image 124 already containing the preprocessed new image 112 can be provided very fast. Afterwards, the accuracy of the distance between two points in different images and/or the smoothness of the transitions between the preprocessed new image 112 and other overlapping images of the plurality of preprocessed or processed images 112, 122 may be increased by re-adjusting the assigned position of the preprocessed new image 112 by the image processor 130. In other words, after preprocessing the new image 112, the storage unit 120 may provide the overview image 124 and later the storage unit 120 may provide a refined overview image 124 after processing the preprocessed image 112 by the image processor 130.

If the preprocessed new image 112 is stored by the storage unit 120, the storage unit 120 may add the processed new image 122 by replacing the stored preprocessed new image 112 by the processed new image 122.

Optionally, the apparatus 200 may comprise an unmanned aerial vehicle control unit 240. The unmanned aerial control unit 240 may generate a control signal 242 for piloting an unmanned aerial vehicle to a region corresponding to an area of the overview image 124 being not already covered by an image of the plurality of preprocessed or processed images 112, 122. In other words, if an unmanned aerial vehicle is used for taking images of an area from which an overview image should be generated, then the unmanned aerial vehicle control unit 240 may pilot the unmanned aerial vehicle to uncovered areas of the overview image to obtain images from the uncovered areas.

Figure 4:
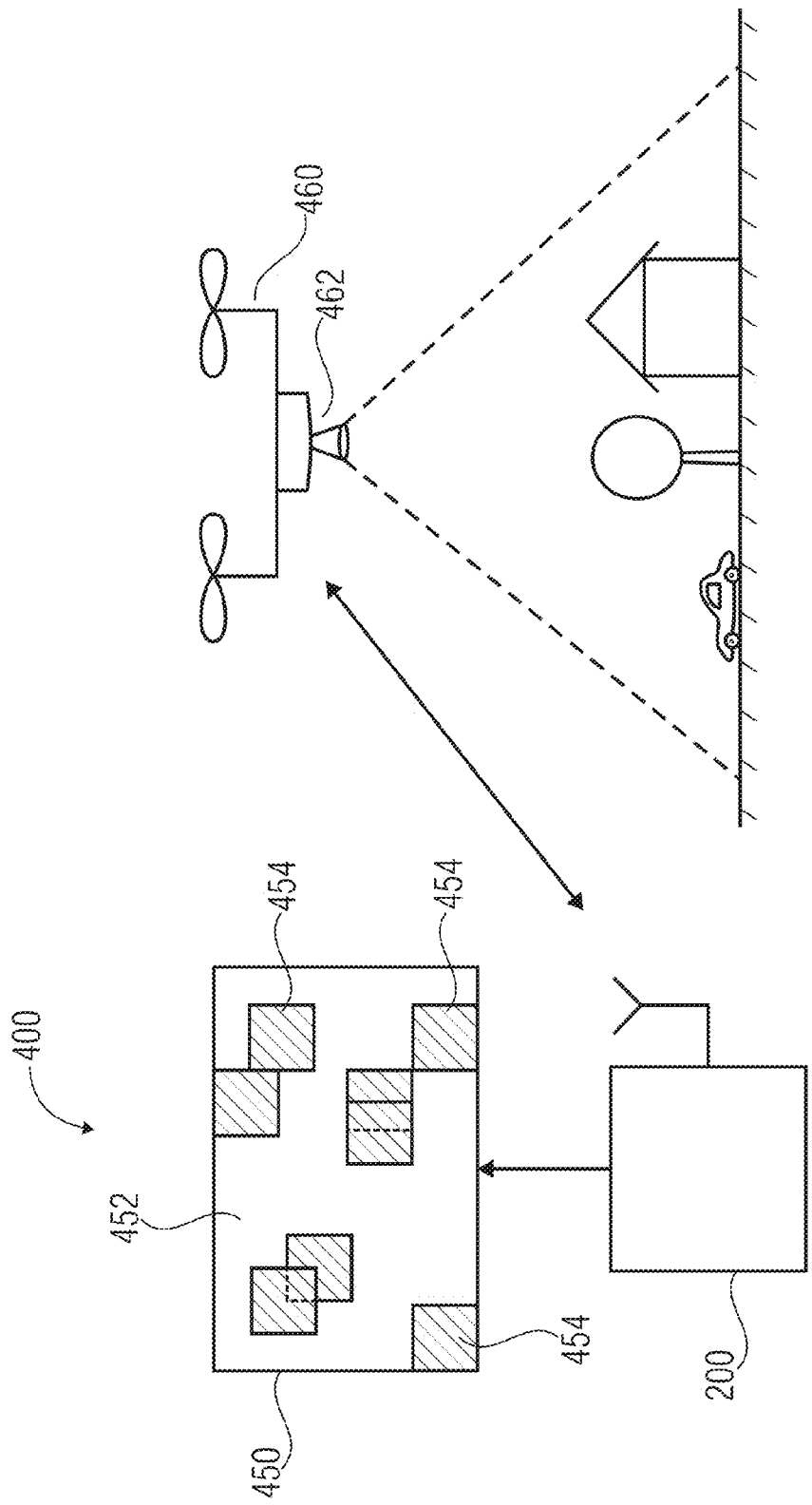
FIG. 4 is a schematic illustration of the generation of an overview image of a plurality of images taken by an unmanned aerial vehicle.

Fittingly, FIG. 4 shows an example of an apparatus 200 piloting an unmanned aerial vehicle 460 with a camera 462 for taking images of the area below the unmanned aerial vehicle 460. The apparatus 200 may transmit a control signal to the unmanned aerial vehicle 460 for piloting the unmanned aerial vehicle 460 to uncovered regions of the overview image 452. The overview image 452 may be provided to a display 450. In this example, the display 450 shows covered areas 454 and uncovered areas of the overview image 452. The unmanned aerial vehicle 460 may take images from the uncovered areas and provide the image data as well as corresponding meta-data (e.g. position information, roll information, pitch information and/or yaw information) to the apparatus 200 for generating the overview image 452 of the plurality of images 454.

Figure 5:
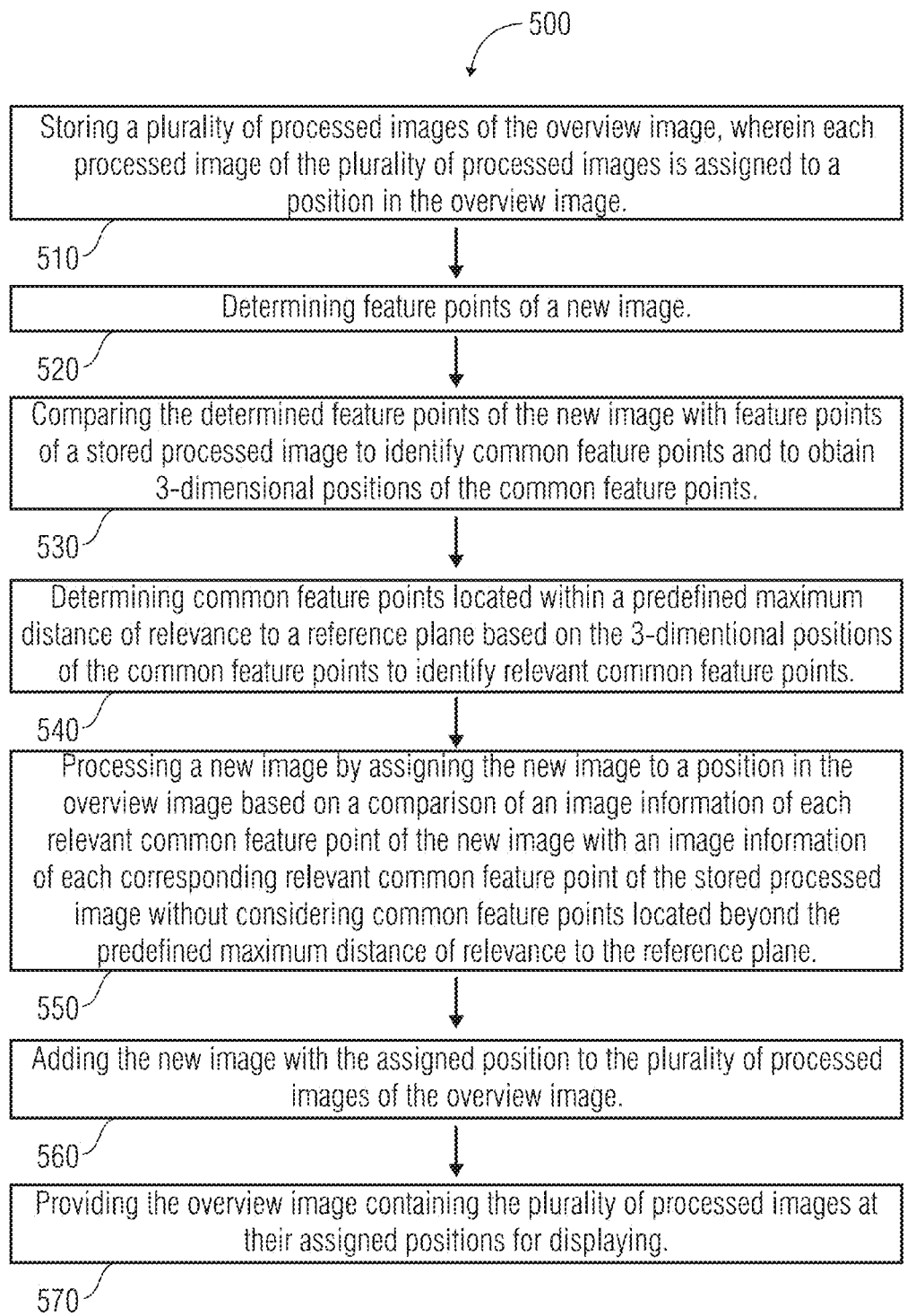
FIG. 5 is a flowchart of a method for generating an overview image of a plurality of images.

FIG. 5 shows a flowchart of a method 500 for generating an overview image of a plurality of images according to an embodiment of the invention. Each image of the plurality of images comprises associated meta-data. The method 500 comprises preprocessing 510 a new image, storing 520 a plurality of preprocessed or processed images of the overview image, determining 530 an overlap region of the preprocessed new image and a stored preprocessed or stored processed image within the overview image, processing 540 the preprocessed new image, adding 550 the processed new image to the plurality of preprocessed or processed images and providing 560 the overview image containing the plurality of preprocessed or processed images. The new image is preprocessed 510 by assigning the new image to a position in the overview image based on a position information being contained by the meta-data of the new image. Further, each stored preprocessed or stored processed image of the plurality of preprocessed or processed images comprising an assigned position in the overview image. The overlap region of the preprocessed new image and the stored preprocessed or stored processed image within the overview image is determined 530 based on the assigned position of the preprocessed new image and the assigned position of the stored preprocessed or stored processed image. Further, the processing 540 of the preprocessed new image is done by re-adjusting the assigned position of the preprocessed new image based on a comparison of features of the overlap region of the preprocessed new image and the stored preprocessed or stored processed image. The processed new image is added 550 to the plurality of preprocessed or processed images with the re-adjusted assigned position. Further, the overview image is provided 560 containing the plurality of preprocessed or processed images at their assigned positions for displaying.

Further, the method 500 may comprise adding the preprocessed new image to the plurality of preprocessed or processed images of the overview image, displaying the overview image containing a preprocessed new image at the assigned position and displaying the overview image containing the processed new image at the re-adjusted assigned position. In this way, a rough overview image may be displayed very fast and a refined overview image may be displayed later on.

Additionally, the method 500 may comprise further steps representing the optional features of the described concept mentioned above.

Figure 6:
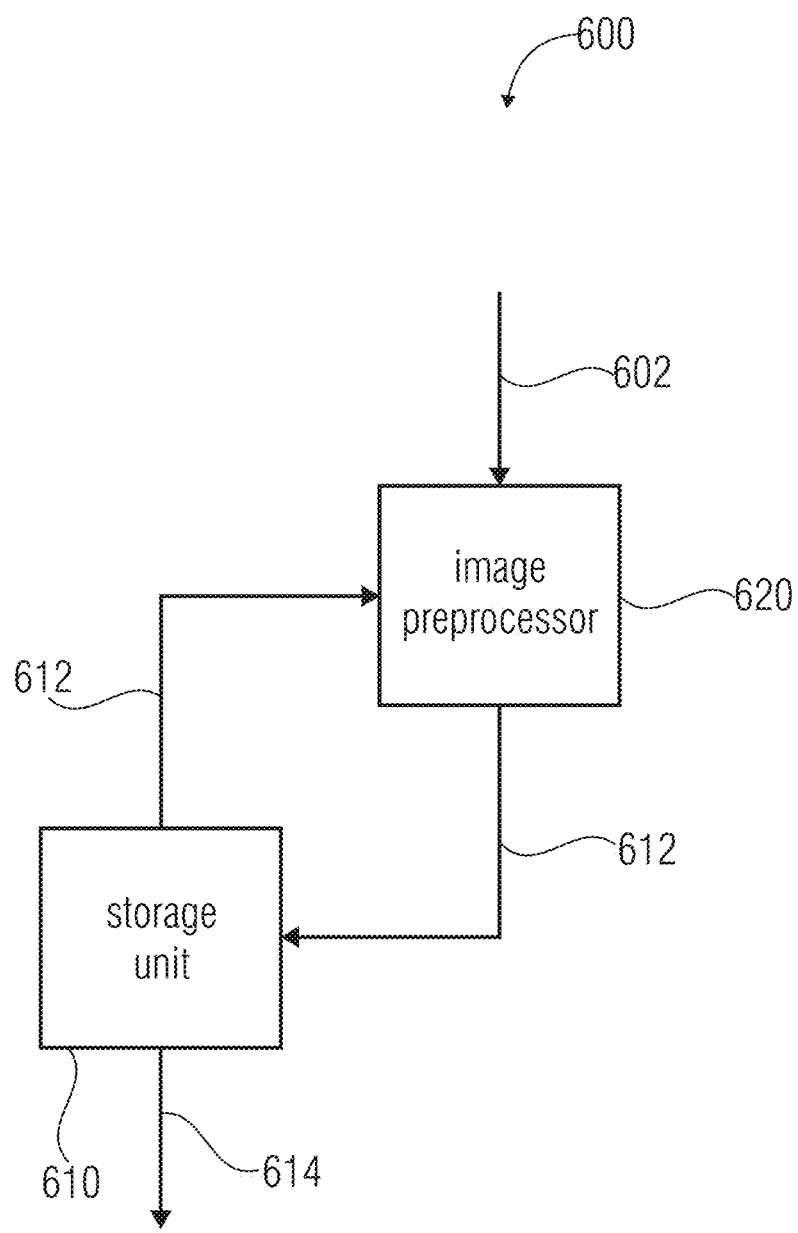
FIG. 6 is a block diagram of an apparatus for generating an overview image of a plurality of images.

FIG. 6 shows a block diagram of a apparatus 600 for generating an overview image 614 of a plurality of images according to an embodiment of the invention. The apparatus 600 comprises a storage unit 610 and an image processor 620. The storage unit 610 is connected to the image processor 620. The storage unit 610 stores a plurality of processed images of the overview image 614. Each processed image 612 of the plurality of processed images comprises an assigned position in the overview image 614. Further, the storage unit 610 is able to provide the overview image 614 containing the plurality of processed images at their assigned positions for displaying. The image processor 620 determines feature points of a new image 602 and compares the determined feature points of the new image 602 with feature points of a stored processed image 612 to identify common feature points and to obtain 3-dimensional positions of the common feature points. Further, the image processor 620 determines common feature points located within a predefined maximum distance of relevance to a reference plane based on the 3-dimensional positions of the common feature points to identify relevant common feature points. Additionally, the image processor 620 processes the new image 602 by assigning the new image to a position in the overview image 614 based on a comparison of an image information of each relevant common feature point of the new image 602 with an image information of each corresponding relevant common feature point of the stored processed image 612 without considering common feature points located beyond the predefined maximum distance to the reference plane. Further, the storage unit 610 adds the processed new image 612 with the assigned position to the plurality of processed images of the overview image 614.

By taking into account only common feature points of the new image 602 and the stored processed image 612 being located within a predefined maximum distance of relevance to a reference plane, a falsification of the assigned position of the new image in the overview image 614 by common feature points located at significantly different elevation levels than the relevant common feature points may be reduced. In this way, distances between two points in different images may be preserved more accurate and/or the smoothness of transitions between overlapping images may be increased.

The storage unit 610 may store each processed image together with the assigned position in the overview image 614. The overview image 614 may be provided to display (which may be an optional part of the apparatus 600).

The feature points determined by the image processor may be, for example, corners or walls of houses, the contours of a car, road markings or similar features. These feature points may be determined by various algorithms as, for example, SIFT (scale-invariant feature transform) or SURF (speeded up robust features). After processing the new image 602 by the image processor 620, the storage unit 610 may add the processed new image 612 together with the determined feature points of the new image to the plurality of processed images. In this way, the feature points determination for an image may only be necessitated one time.

After determining the feature points of the new image 602, these feature points may be compared to feature points of a stored processed image (e.g. an overlapping image) to identify common feature points by using, for example, a correlation function (e.g. nearest neighbor). Further, for these common feature points 3-dimensional positions of the common feature points may be determined, for example, by using methods of multi-view geometry.

Then, common feature points located within a predefined maximum distance of relevance to a reference plane are determined. The reference plane may be predefined or may be determined by the image processor 620 based on the 3-dimensional positions of the common feature points. For example, a predefined reference plane may be a horizontal plane of a 3-dimensional coordinate system (e.g. Cartesian coordinate system) with the z-coordinate equal to 0 or another predefined value. Alternatively, the image processor 620 may determine the reference plane by fitting a horizontal plane to the 3-dimensional positions of the common feature points, so that a maximal number of common feature points are located within a predefined maximal fitting distance to the reference plane or so that the reference plane is as far away as possible from a camera position, the new image was taken from, with at least one common feature point located within the predefined maximal fitting distance. The maximal fitting distance may vary between zero and, for example, a value depending on a maximal height difference of the common feature points. Alternatively, the reference plane may be a non-horizontal plane.

By choosing the maximal predefined distance of relevance, the accuracy of preserving the distances between points in different images and/or the smoothness of transitions between images may be influenced. By choosing a large maximum distance of relevance, more relevant common feature points are identified, which are taken into account for assigning the position of the new image. This may increase the statistic, since more common feature points are considered, but may also increase the error obtained by considering points at different elevation levels. An opposite effect is obtained by choosing a low predefined maximum distance of relevance. The predefined maximum distance of relevance may also be zero, so that only common feature points are identified as relevant which are located in the reference plane. The maximal fitting distance may be equal to the maximal distance of relevance.

For example, common feature points may be road markings and the reference plane may be the road. In this way, only common feature points located at the height of the street may be considered for assigning the position. In this way, an error obtained by considering feature points at different elevation levels (e.g. feature points located at cars, houses or street lights) may be suppressed completely or nearly completely.

The image information of a relevant common feature point may be, for example, the position of the feature point in the image itself or the image data of an area of the image around the relevant common feature point. More accurately, the image information of a relevant common feature point in the new image 602 may be the position of the relevant common feature point in the new image 602 and the image information of a relevant common feature point in the stored image 612 may be a position of the relevant common feature point in the stored image. With this, the image processor 620 may assign the new image 602 to a position in the overview image 614, so that a distance between a position of a relevant common feature point in the new image 602 and a position of a corresponding relevant common feature point in the stored image 612 is minimized or so that a sum of distances between the position of the relevant common feature points in the new image 602 and the positions of the respective corresponding relevant common feature points in the stored image 612 is minimized.

Alternatively, the image information of a relevant common feature point in the new image 602 may be an area of the new image 602 around the relevant common feature point of a predefined size and the image information of a relevant common feature point in the stored image 612 may be an area of the stored image 612 around a relevant common feature point of the predefined size. In this case, the image processor 620 may assign the new image 602 to a position in the overview image 614, so that a correlation value of an area around a relevant common feature point of the new image 602 and an area around a corresponding relevant common feature point of the stored image 612 is maximized or so that the sum of correlation values of areas around relevant common feature points of the new image 602 and areas around respective corresponding relevant common feature points of the stored image 612 is maximized. A correlation value may be determined, for example, based on a given correlation function for correlating images or parts of images.

Further, both mentioned examples may be combined so that the image processor 620 may assign the new image 602 to a position in the overview image 614 based on the minimization of the distance or the sum of distances and re-adjusts the assignment of the new image 602 to a position in the overview image 614 based on the maximization of a correlation value or a sum of correlation values.

The image processor 620 may determine feature points of the new image 602 for the whole image or only parts of the new images 602 overlapping another image of the plurality of processed images. Determining feature points from the whole image may increase the efforts, but the determined feature points can be stored together with the new image after processing, so that the feature points may only be determined once.

Independent from the determination of the feature points, only feature points located within an overlapping region of the new image and the stored image 612 may be considered for identifying common feature points. For this, for example the image processor 620 may determine an overlap region of the new image 602 and the stored image 612. Further, the image processor 620 may compare determined feature points of the new image 602 located in the overlap region with feature points of the stored image 612 located in the overlap region, while determined feature points outside the overlap region are neglected for the identification of common feature points.

The storage unit 610 and the image processor 620 may be, for example, independent hardware units or part of a computer or micro controller as well as a computer program or a software product configured to run on a computer or a micro controller.

Figure 7:
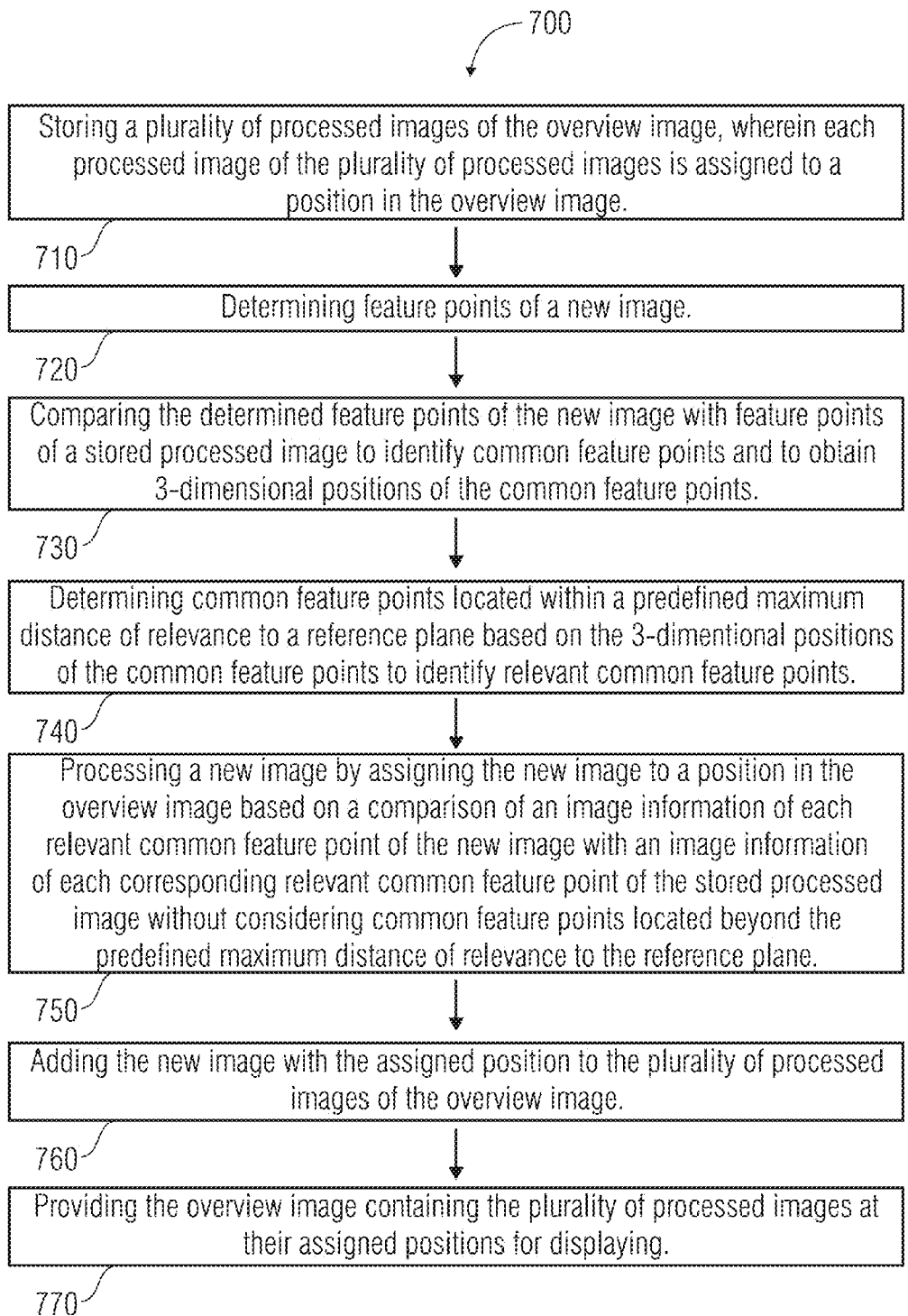
FIG. 7 is a flowchart of a method for generating an overview image of a plurality of images.

FIG. 7 shows a flowchart of a method 700 for generating an overview image of a plurality of images according to an embodiment of the invention. The method 700 comprises storing 710 a plurality of processed images, determining 720 feature points of a new image, comparing 730 the determined feature points of the new image with feature points of a stored processed image, determining 740 common feature points, processing 750 the new image, adding 760 the processed new image to the plurality of processed images of the overview image and providing 770 the overview image. Each stored processed image of the plurality of processed images comprises an assigned position in the overview image. The determined feature points of the new image are compared 730 with feature points of a stored processed image to identify common feature points and to obtain 3-dimensional positions of the common feature points. Further, common feature points located within a predefined maximum distance of relevance to a reference plane are determined 740 based on the 3-dimensional positions of the common feature points to identify relevant common feature points. The new image is processed 750 by assigning the new image to a position in the overview image based on a comparison of an image information of each relevant common feature point of the new image with an image information of each corresponding relevant common feature point of the stored processed image without considering common feature points located beyond the predefined maximum distance of relevance to the reference plane. Further, the processed new image is added 760 to the plurality of processed images of the overview image with the assigned position. Additionally, the overview image containing the plurality of processed images at their assigned positions is provided 770 for displaying.

Optionally, the method 700 may comprise further steps representing features of the described concept mentioned above.

Some embodiments according to the invention relate to an apparatus for generating an overview image of a plurality of images combining the features of the apparatus shown in FIG. 1 and the features of the apparatus shown in FIG. 6.

For example, the image processor 130 of apparatus 100 may re-adjust the assigned position of the preprocessed new image based on a comparison of an image information of relevant common feature points of the new image with an image information of each corresponding relevant common feature point of a stored processed image without considering common feature points located beyond a predefined maximum distance of relevance to a reference plane. For this, the image processor 130 may determine feature points of the preprocessed new image and may compare the determined feature points of the preprocessed new image with feature points of a stored processed image to identify common feature points and to obtain 3-dimensional positions of the common feature points. Further, the image processor 130 may determine common feature points located within a predefined maximum distance of relevance to a reference plane based on the 3-dimensional positions of the common feature points to identify relevant common feature points.

Optionally, the apparatus 100 may realize further features, for example, mentioned in connection with the apparatus 600 shown in FIG. 6.

The other way around, for example, the apparatus 600 may comprise additionally an image preprocessor 110 and the image processor 620 may comprise an accuracy information input 134 and a controllable processing engine 132 as mentioned in connection with the apparatus 100 shown in FIG. 1. In this example, each image of the plurality of images may comprise associated meta-data. Further, the image preprocessor 110 may preprocess a new image by assigning the new image to a position in the overview image based on a position information contained by the meta-data of the new image. The storage unit 610 may store a plurality of preprocessed or processed images of the overview image, wherein each preprocessed or processed image of the plurality of preprocessed or processed images comprises an assigned position in the overview image. The storage unit 610 may provide an overview image containing the plurality of preprocessed or processed images at their assigned positions for displaying. Further, the image processor 620 may determine an overlap region of the preprocessed new image and a stored preprocessed or stored processed image within the overview image based on the assigned position of the preprocessed new image and the assigned position of the stored preprocessed or stored processed image. The controllable processing engine 132 may process the preprocessed image by re-adjusting the assigned position of the preprocessed new image according to the originally defined image processor 610, but with the restriction that the controllable processing engine 132, and in that way the image processor 610, is controlled by the accuracy information of the position information received by the accuracy information input, so that a maximal re-adjustment of the assigned position of the preprocessed new image is limited based on the received accuracy information of the position information.

Optionally, the apparatus 600 may realize further, for example, features mentioned in connection with apparatus 100 shown in FIG. 1 or apparatus 200 shown in FIG. 2.

In the following, a detailed example for using a combination of the features described above is given. In this example, the images are taken by an unmanned aerial vehicle, although the described inventive concept may also be used or implemented, if images are provided, for example, by a storage unit (e.g. memory card or multimedia card of a digital camera or a hard disk of a computer).

Figure 12:
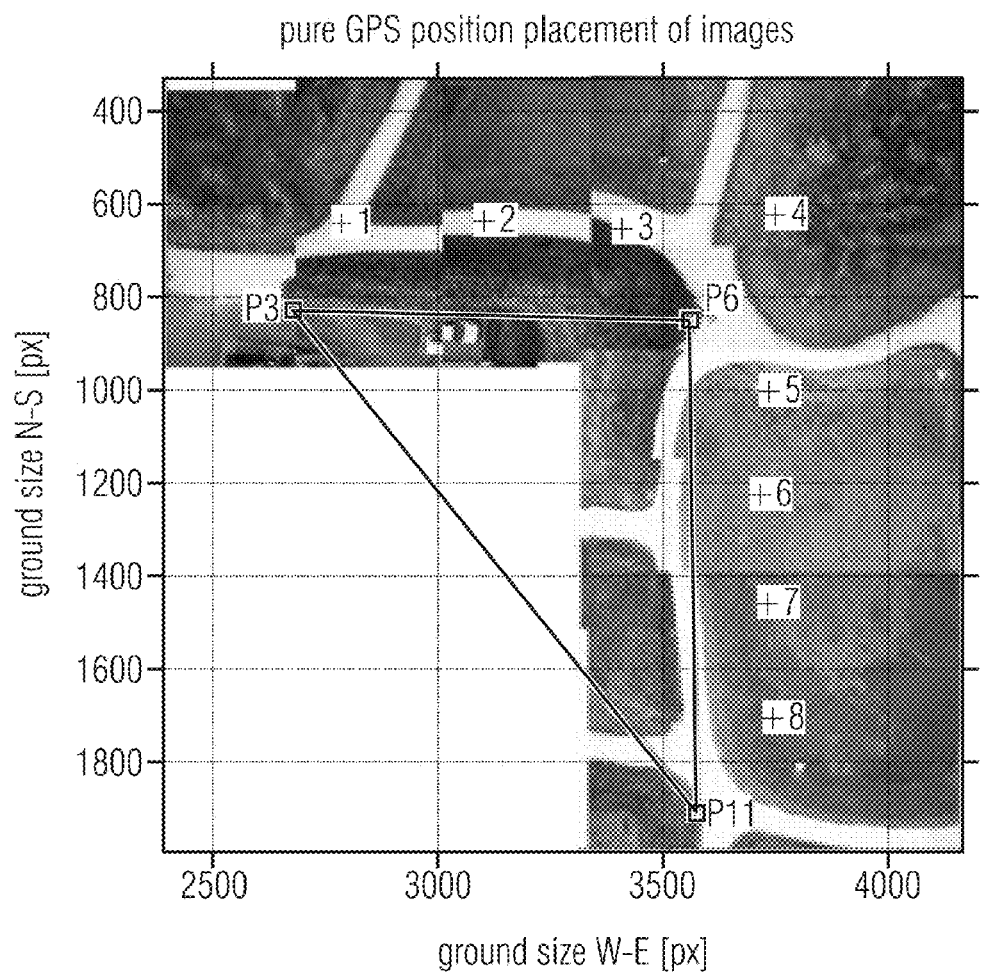
FIG. 12 is an illustration of a position-based alignment of eight images.

A very simple and naive approach is to align the images based on the camera's position. Hence, for image alignment the world coordinates of the camera are mapped to corresponding pixel coordinates in the generated overview image. Defining the origin of the overview image of the observed target area as $o_{world}=(lat; lon; alt)^T$ in world coordinates, all image coordinates are related to this origin on the local tangential plane (LTP) by approximation to the earth model WGS84. Given the camera's position area covered by the picture in world coordinates relative to the origin is computed taking into account the camera's intrinsic parameters. The relative world coordinates are directly related to the pixel coordinates in the generated overview image. An example of the resulting overview image is depicted in FIG. 12 utilizing the placement function with transformation being just a simple translation for each image. In this approach reasonably accurate position information is assumed and a nadir view but do not take into account the camera's orientation. Obviously, effects introduced by non-planar surfaces can not be compensated with this approach. A more advanced approach is to extend the naive position-based alignment by compensating the camera's orientation deviation (i.e., roll, pitch, yaw angles). The placement function of the individual images to generate the overview image is the same as before. But instead of considering only translation, a perspective transformation with eight degrees of freedom may be used.

Figure 13:
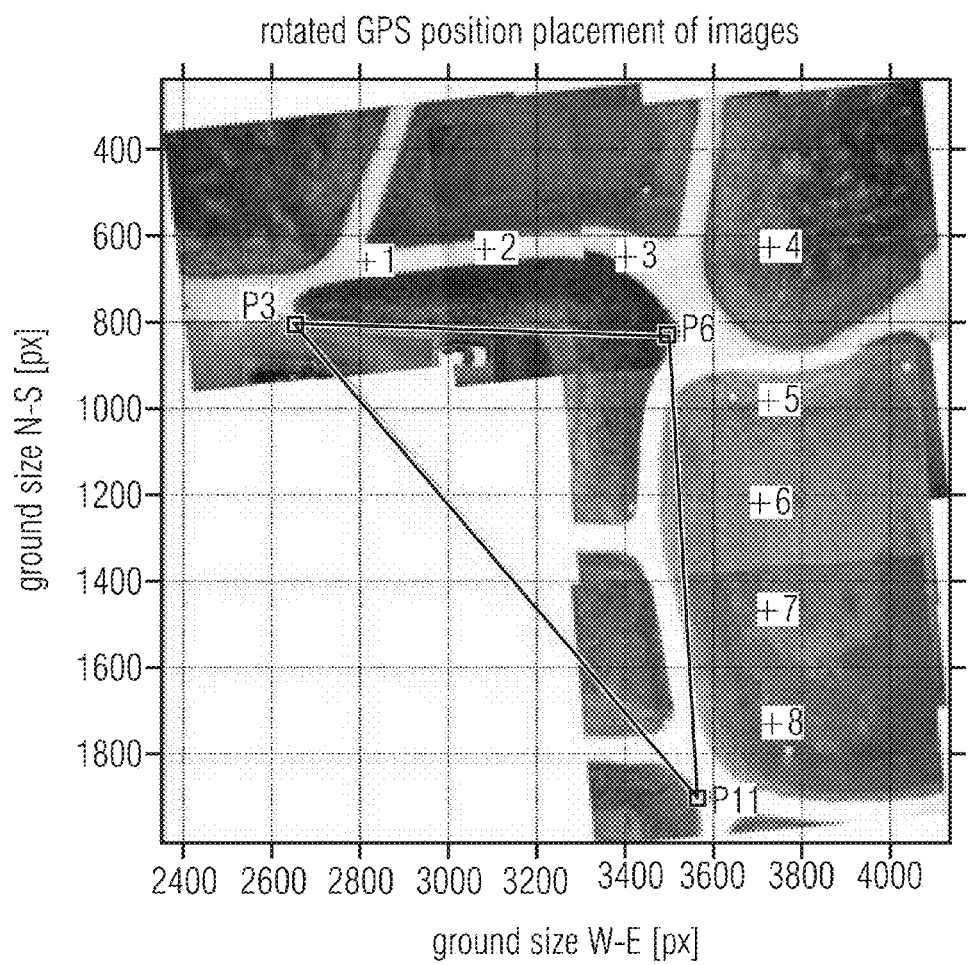
FIG. 13 is an illustration of a position and orientation-based alignment of eight images.

If a nadir view (i.e., neglecting deviation of roll and pitch angles) is assumed, the transformation is reduced to a similarity transformation. An example is shown in FIG. 13.

Further, image-based alignment can be categorized into pixel-based, and feature-based methods. The idea is to find transformations $T_i$ and consequently the position of each new image which maximizes the quality function:

$$\lambda(\text{Merge}(I_{res,i-1}, T_i(I_i)))$$

Figure 14:
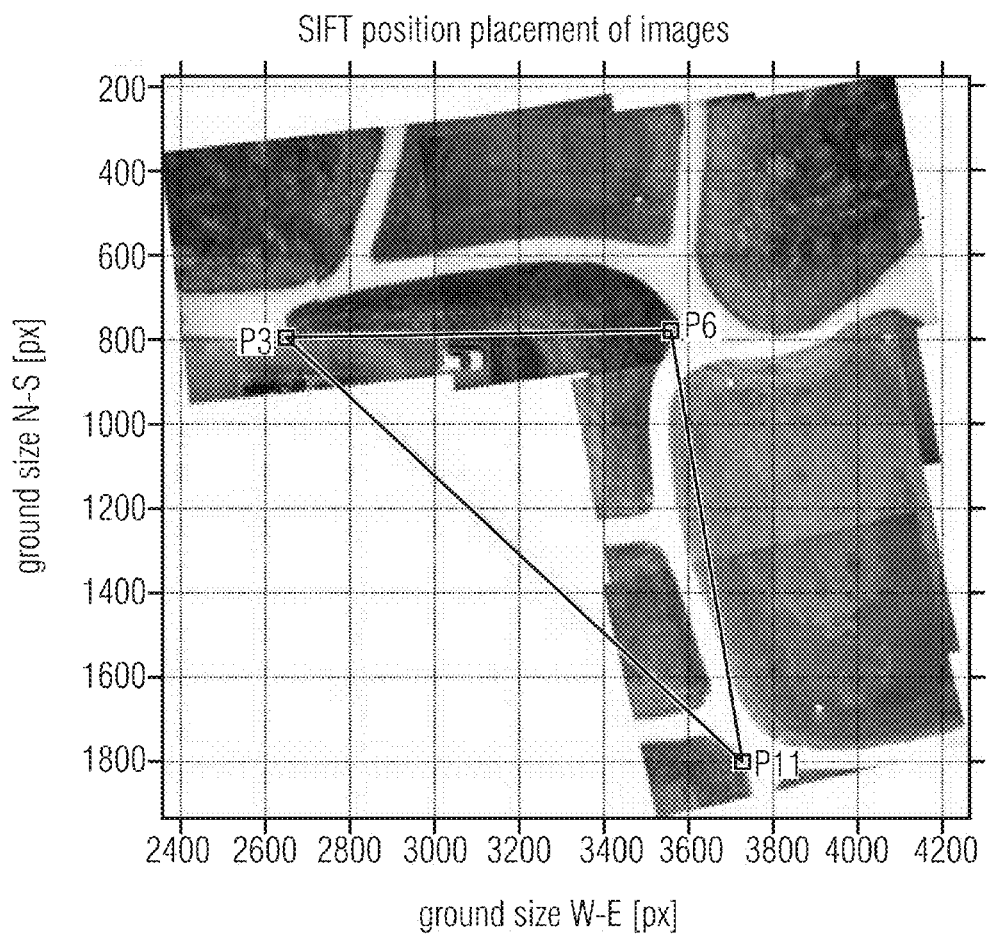
FIG. 14 is an illustration of an image-based alignment using SIFT features.

The pixel-based approaches are computationally more expensive because the quality function is computed from all pixels in the overlapping parts of two images. Feature-based approaches try to reduce the computational effort by first extracting distinctive feature points and then match the feature points in overlapping parts. Depending on the chosen degree of freedom the resulting transformation ranges from a similarity transformation to a perspective transformation. The benefit of this approach is that the generated overview image is visually more appealing. But on the other hand, the major disadvantages are that the search space grows with the number of images to be stitched and the images may get distorted. An example is shown in FIG. 14.

According to one aspect multiple small-scale UAVs may be deployed to support first responders in disaster assessment and disaster management. In particular commercially available quadrocopters may be used since they are agile, easy to fly and very stable in the air due to sophisticated on-board control. The UAV may be equipped with an RGB camera (red, green blue).

The intended use-case can be sketched as follows: The operator first specifies the areas to be observed on a digital map and defines the quality parameters for each area (see for example "M. Quaritsch, E. Stojanovski, C. Bettstetter, G. Friedrich, H. Hellwagner, M. Hofbaur, M. Shah, and B. Rinner. Collaborative Microdrones: Applications and Research Challenges. In Proceedings of the Second International Conference on Autonomic Computing and Communication Systems (Autonomics 2008), page 7, Turin, Italy, September 2008"). Quality parameters include, for example, the spatial and temporal resolution of the generated overview image, and the minimum and maximum flight altitude, among others.

Based on the user's input, the system generates plans for the individual drones to cover the observation areas (see for example "M. Quaritsch, K. Kruggl, D. Wischounig-Strucl, S. Bhattacharya, M. Shah, and B. Rinner. Networked UAVs as Aerial Sensor Network for Disaster Management Applications. e&i Journal, 127(3):56-63, March 2010"). Therefore, the observation areas are partitioned into smaller areas covered by a single picture taken from a UAV flying at a certain height. The partitioning has to consider a certain overlap of neighboring images which is useful in the stitching process. Given a partitioning the continuous areas to be covered can be discretized to a set of so-called picture-points. The picture-points are placed in the center of each partition at the chosen height. The pictures are taken with the camera pointing downwards (nadir view).

The mission planner component (e.g. unmanned aerial vehicle control unit) generates routes for individual UAVs such that each picture-point is visited taking into account the UAV's resource limitations. The images together with meta-data (i.e., the position and orientation of the camera) are transferred to the base-station during flight where the individual images are stitched to an overview image.

The major goal is to generate an overall image $I_{res;n}$ of the target area given a set of n individual images $\{I_i\}$. For example, the overall image can be iteratively constructed as follows:

$$I_{res,0}=O, I_{res,i}=\text{Merge}(I_{res,i-1}, T_i(I_i))$$

where O is an empty background matrix, T is a transformation function and the Merge function combines the transformed image to the overall image.

This mosaicking can be described as an optimization problem, in which $T_i$ has to be found in a way that it maximizes a quality function $\lambda(I_{res,i})$. This quality function, based on the system use case, balances the visual appearance (improving the smoothness of transitions) and the geo-referencing accuracy (accuracy of preserving distances). While in some applications it is more important to have a visually appealing overview image, other applications may involve accurate geo-referencing in the overview image. A quality function may be used that is a combination of the correlation between overlapping images and relative distances in the generated overview image compared to the ground truth.

Some challenges for solving the problem using images from low-flying, small-scale UAVs are mentioned in the following.

When taking images from a low altitude the assumption of a planar surface is no longer true. Objects such as buildings, trees and even cars cause high perspective distortions in images. Without a common ground plane, the matching of overlapping images may utilize depth information. Image transformations exploiting correspondences of points at different elevations may result in severe matching errors.

Further, due to their light weight small-scale UAVs are vulnerable to wind influences requiring high-dynamic control actions to achieve a stable flight behavior. Even if the onboard camera position is actively compensated, a perfect nadir-view of the images cannot be provided.

The UAV's auxiliary sensors such as GPS, IMU and altimeter are used to determine its position and orientation. However, such auxiliary sensors in small-scale UAVs provide only limited accuracy which is not comparable with larger aircrafts. As consequence, it can not be relied on accurate and reliable position, orientation and altitude data of the UAV. Hence it has to be dealt with this inaccuracy in the mosaicking process.

Additionally, the resources such as computation power and memory on-board the UAVs but also on the ground station may be very limited. In disaster situations it is usually not possible to have a huge computing infrastructure available. The base-station may consist of notebooks and standard desktop PCs. But at the same time, the overview image should be presented as quick as possible The individual images may be taken from multiple UAVs in an arbitrary order. An incremental approach may be used to present the user the available image data as early as possible while the UAVs are still on their mission. The more images are taken the better the overview image gets. This also means that for a new image, the position of already processed image may be adjusted to improve the overall quality.

For example, as described an appropriate transformation $T_i$ for each image $I_i$ captured at a picture-point may be found in order to solve the mosaicking problem. There are two basic approaches for computing these transformations: The meta-data approach exploits auxiliary sensor information to derive the position and orientation of the camera which is then used to compute the transformations. In this case that auxiliary sensor data (i.e., GPS, altitude and time) may be provided for each captured image. The image-based approach only exploits image data to compute the transformations.

The proposed concept may realize a combination of meta-data-based and image-based methods enhancing the meta-data-based alignment with image-based alignment. The presented approaches vary in their resource requirements and their achieved results.

An aspect is to first place the new images based on the camera's position (position information) and orientation information (e.g. roll, nick, yaw) on the already generated overview image. In the next step, image-based methods are used to correct for inaccurate position and orientation information and at the same time improve the visual appearance. Since the approximate position of the image is already known from the camera's position, the search-space can be significantly reduced (by limiting the maximal re-adjustment). Thus, the transformation T, mentioned before may be split into two transformation whereas the $T_{i,pos}$ represents the transformation based on the camera's position and orientation and $T_{i,img}$ represents the transformation which optimizes the alignment using the image-based method.

Transformations $T_{i,img}$ and $T_{i,pos}$ which maximize the quality function may be advantageous:

$$\lambda(\text{Merge}(I_{res,i-1}, T_{i,img} \circ T_{i,pos}(I_i))),$$

The search space may be limited to a reduced set of possible positions based on the expected inaccuracy of position and orientation information (accuracy information of the position information and optionally the accuracy information of the roll, nick or yaw).

With this proposed approach an appealing overview image without significant perspective distortions may be generated and at the same time the relative distances and geo-references in the overview image can be maintained. Moreover, this approach can cope with inaccurate position and orientation information of the camera and thus avoid stitching disparities in the overview image.

Figure 8:
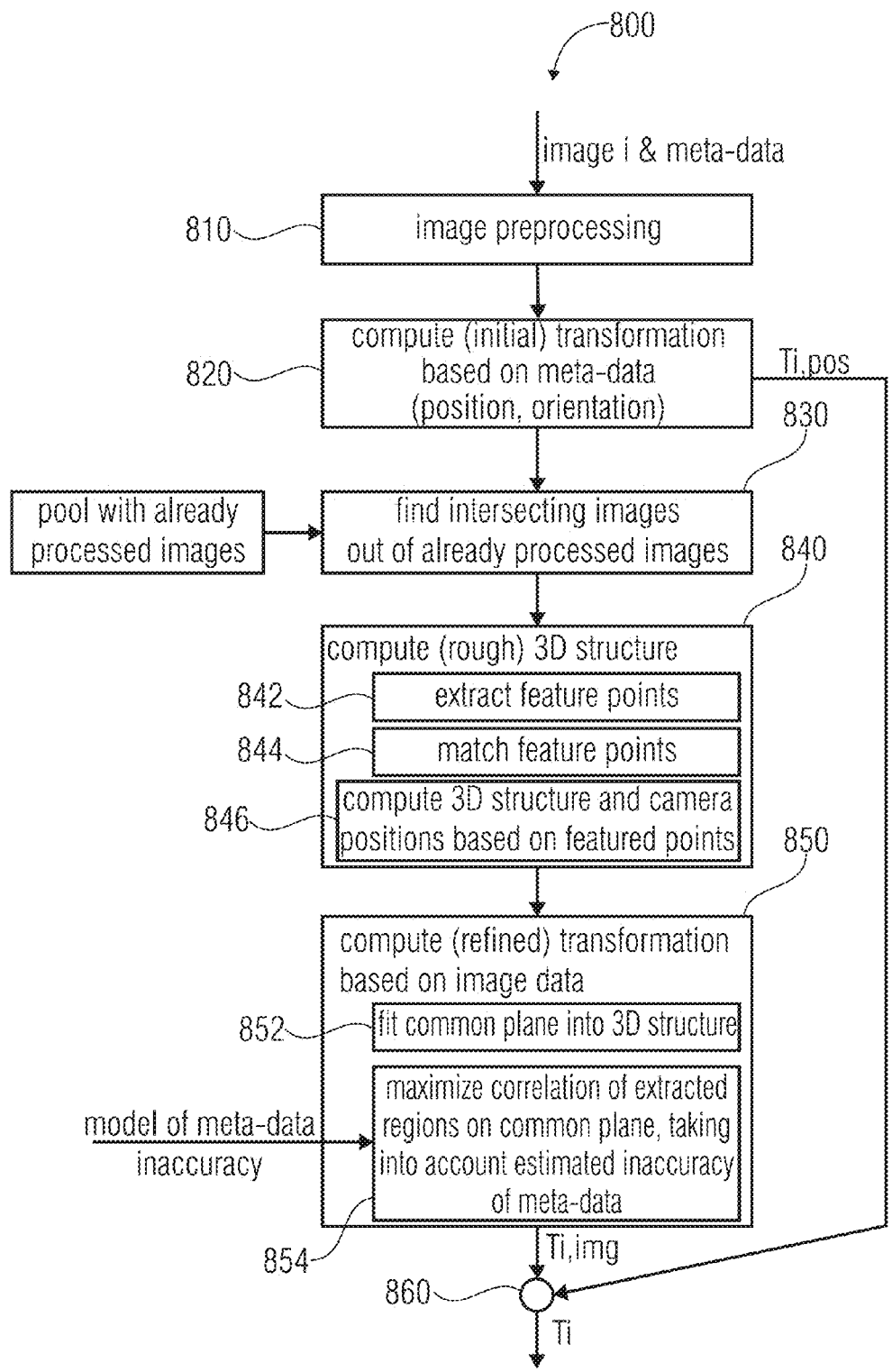
FIG. 8 is a flowchart of a method for generating an overview image of a plurality of images.

In the following, some examples for technical details on image mosaicking from micro-UAVs flying at low altitude are described. A possible process 800 of aligning images taken from mico-UAVs flying at low altitude is sketched in FIG. 8.

The input for the whole processing pipeline is a new image taken from the camera on-board the UAV and a set of meta-data. The meta-data contains information on the (e.g. GPS-) position where the photo has been taken as well as information on the UAV's and thus the camera's pose (yaw, nick, roll)—also known as extrinsic camera parameters. Due to the limited capabilities of the UAVs—and the small and relatively cheap inertial measurement units (IMU)—the meta-data is inaccurate to some degree. For example the accuracy of GPS-positions is in the range of up to 10 meters and also the measured angles have errors.

Firstly, the image is preprocessed 810. The image preprocessing 810 may include several steps to improve the original images taken by a camera. For example, lens distortions are corrected.

Secondly, an image transformation based on meta-data is performed 820 (assigning the new image to a position in the overview image). Given the image's meta-data, quickly the transformation $T_{i,pos}$ can be computed which is solely based on the meta-data. This transformation basically includes a translation and rotation (to take into account the UAV's heading(yaw)) and optionally warps the image as it has been taken at a nadir view (i.e., correct nick and roll angles).

Thirdly, intersecting images may be found 830 (determining an overlap region). Based on the image position in the pool of already processed images those that intersect with the current one are identified. If no image can be found, further processing is postponed until at least one intersecting image is available. In this case the current image is placed in the overview image only based on the meta-data ($T_{i,pos}$).

Fourthly, a (rough) 3D structure is computed 840. For this, the original image (new image) and the set of images that intersect (overlap) the original one are considered. First feature-points from the new image are extracted 842 (determine feature points). Different algorithms can be used to compute feature-points (e.g., SIFT, SURF, . . . ). For the already processed images the feature-points can be stored separately and thus avoid repeated computation. Consequently, a set of feature-points for each image to consider is obtained. Next, the feature-points from the individual images are matched 844 (determine common feature points) using some correlation function (e.g., nearest neighbor). Thus, a mapping, which feature-point in one image is (expected to be) the same point in the other images is established. Using this set of corresponding feature-points, for example, methods of multi-view geometry (structure from motion) can be exploited to estimate both, the camera's positions and the 3D position of the feature-points 846.

Fifthly, the transformation is refined 850 based on the 3D structure and image data. The input for this step is the set of intersecting images and the rough 3D structure of the scene computed in the previous step. By rough 3D structure, a point-cloud in 3D space with their corresponding image coordinates is understood. One major goal is to maintain geo-referencing as good as possible and at the same time compute a visually appealing overview image. In order to achieve this goal, for example, the transformation is computed based on point-matches on a common plane (reference plane, e.g. advantageously the ground plane) and ignore regions which are at different elevation levels (e.g., cars, trees, etc.). For this, given the 3D point-cloud a common plane may be extracted. Thus horizontal planes may be fit 852 into the point-cloud and select a common plane (e.g., the plane far away from the camera, or the plane with the highest number of points lying on it, etc.). For the next steps only those points that lie on the selected common plane (relevant common feature points) may be considered. Then, the transformation $T_{i,img}$ that optimizes the placement of the image further may be computed. This can be done either by only considering the selected point-correspondences, or by considering a certain region around the point-correspondences, or both.

In the first case a transformation that minimize the distance between corresponding points can be computed. In the second case a region around the corresponding points can be defined and the correlation within corresponding regions can be maximized. Various methods can be used, e.g. simple pixel differencing or optical flow methods. In the latter case, the transformation based on corresponding points may be used as a starting point which is then further refined by correlation-based methods.

From the sensor model, additional information on how accurate the meta-data is were obtained. In this last refinement step, the sensor model restricts the transformation $T_{i,img}$. This step can be considered optional and also depends on the method used to refine $T_{i,img}$. For example if the GPS-position is known to be up to 2 m inaccurate point correspondences (relevant common feature points) that suggest a position error of 7 m can be ignored. Or for the correlation based approach the search range can be limited 854 to the according range.

The output of the algorithm described above are two transformations and $T_{i,img}$. The first one can be computed very quickly which allows fast placement of the individual images on an overview map (overview image). The latter one includes somewhat more computational effort and thus involves more time. However, for interactive systems images can be displayed immediately based on the initial transformation and later on refined. The final transformation $T_i$ is the combination 860 (re-adjustment of the position of the new image) of $T_{i,pos}$ and $T_{i,img}$.

In the following, the results of known approaches with are compared with the proposed hybrid approach. This evaluation mainly focuses on the geospatial accuracy and image correlation which are specified in a quality metric. Further, the computation times involved of all approaches are compared which have been implemented, for example, in Matlab on a standard PC running at 2.66 GHz.

For the evaluation, a rectangular round trip mission for which 40 picture points have been planned is used. Images have been captured from a single UAV flying at an altitude of approximately 30 m. The overlap among adjacent images is about 60%. A subset of 8 images is used to compare the stitching results of the known mosaicking approaches.

To evaluate the quality of the different mosaicking approaches the following metric for the overview image quality is defined, for example:

$$\lambda(I_{res}) = \alpha \cdot \lambda_{spat}(I_{res}) + (1 - \alpha) \cdot \lambda_{corr}(I_{res}) \qquad (1)$$

where $$\lambda_{spat} = \frac{1}{m} \sum_{i=1}^{m} \frac{1}{1 + \left|\frac{d_i - \hat{d}_i}{d_i}\right|},$$

$$\lambda_{corr} = \frac{1}{n} \sum_{i=1}^{n} \frac{1 + CC(\text{Overlaps}(I_{res,i-1}, T_i(I_i)))}{2},$$

$$CC(X, Y) = \frac{\text{Covariance}(X, Y)}{\sigma_X \sigma_Y},$$

$d_i$ is the actual distance measured between two ground control points, $\hat{d}_i$ is the estimated distance extracted from overview image and m is the number of considered distances. As it can be deduced from the equations, $\lambda_{spat}$ and $\lambda_{corr}$ are all in the range of (0, 1]. The total quality function $\lambda$ is a weighted combination of $\lambda_{spat}$ and $\lambda_{corr}$ (0≤a≤1). $\lambda_{spat}$ represents the accuracy of spatial distances while $\lambda_{corr}$ shows the correlation in areas of overlapping images, which is a measure for the seamlessness mosaicking. In this example the weight a=0:5.

|  | Reference | Pos | Pos + Rot | Image | Hybrid |
|---|---|---|---|---|---|
| $\|\overline{P_3P_6}\|$ [m] | 31 | 31.54 | 30.53 | 30.13 | 31.30 |
| $\|\overline{P_6P_{11}}\|$ [m] | 37.9 | 38.17 | 38.07 | 38.27 | 38.19 |
| $\|\overline{P_3P_{11}}\|$ [m] | 51.75 | 50.61 | 50.76 | 50.93 | 52.40 |
| $\lambda_{spat}(I_{res})$ [%] |  | 95.3 | 96.1 | 94.6 | 96.9 |
| $\lambda_{corr}(I_{res})$ [%] |  | 69.6 | 74.5 | 82.4 | 86.7 |
| $\lambda(I_{res})$ [%] |  | 82.4 | 85.3 | 88.5 | 91.8 |

The quality of correlation $\lambda_{corr}$ can easily be noticed in the overview images in FIG. 2, that is increasing by the complexity of the approaches.

In the evaluation a triangle is chosen, spanning significant points ($P_3$; $P_6$; $P_{11}$) for simplified spatial evaluation in the reduced set of eight images (e.g. shown in FIG. 10a). The table above shows a spatial accuracy and quality parameters of three known and the proposed mosaicking approaches. In the table the measured distances ($|\overline{P_3P_6}|, |\overline{P_6P_{11}}|, |\overline{P_3P_{11}}|$), the resulting spatial quality and the correlation quality $\lambda(I_{Res})$ are presented and combined according to Equation 1 to a final quality characteristic to compare the presented approaches. Metadata-based approaches, like the position-based approach and the position-based approach with rotation retain geo-referencing, if only similarity transformations are used. Image-based approaches even when restricting the matching function to a similarity transformation show a good correlation quality. The computation time for the whole set of 37 images in the scaled resolution of 400 by 300 px took $t_{pos}$=17:31 s for position-based, $t_{pos+rot}$=18:33 s with rotation, and increased dramatically to $t_{image}$=459:20 s in the image-based alignment approach.

Figure 10A:
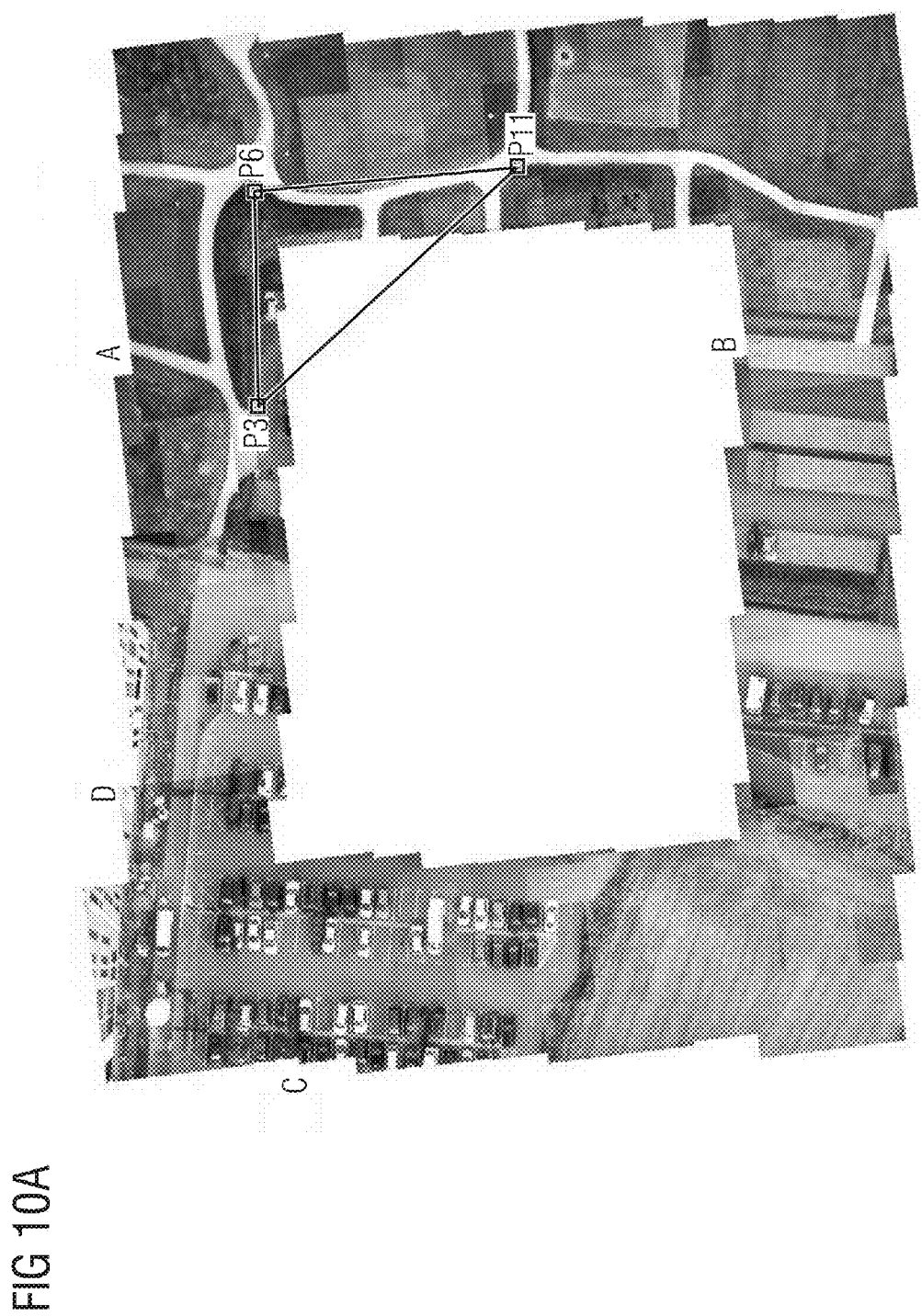
FIG. 10a is an example for an overview image of a plurality of images.
Figure 10B:
FIG. 10b is another example for an overview image of a plurality of images.
Figure 11A:
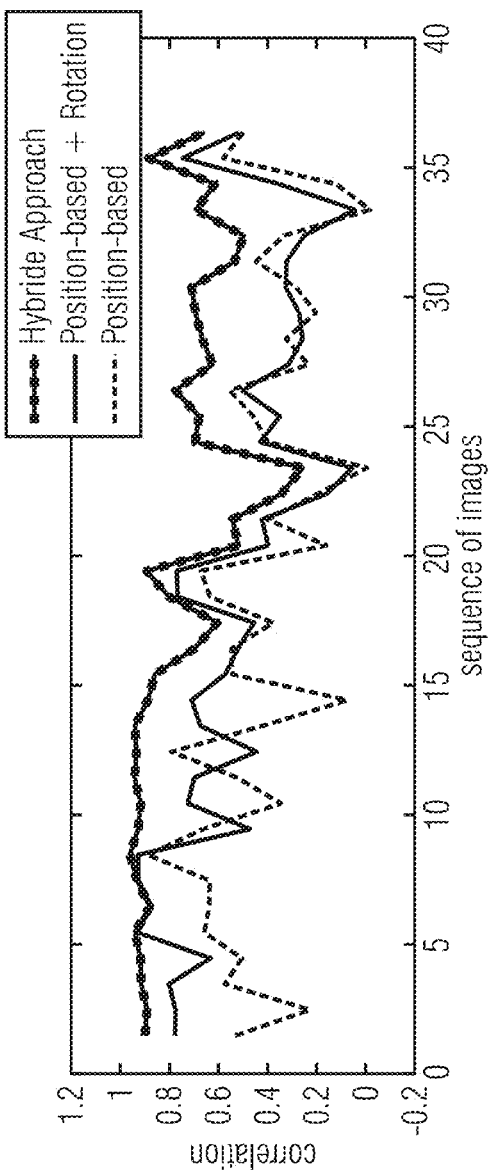
FIG. 11a is a diagram indicating a comparison between correlation of the overlapping parts of two adjacent images in different approaches.
Figure 11B:
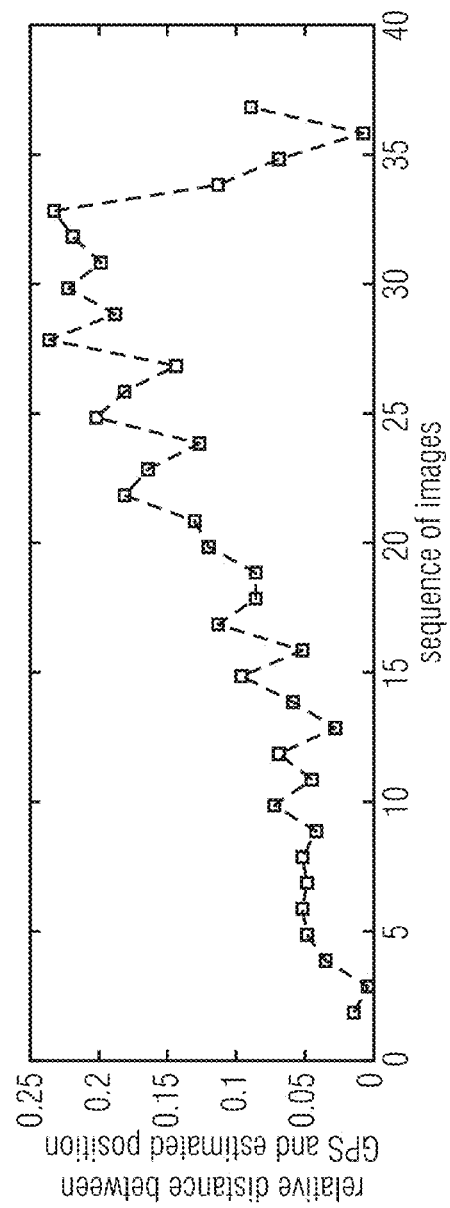
FIG. 11b is a diagram indicating the relative distance between the estimated position and the GPS position.

The complete round trip mission is used to evaluate the hybrid approach (FIG. 10a). However, three images were lost in the real UAV mission (cp. positions B, C and D in FIG. 10a) which reduced the overlap in these specific areas to approximately 20%. As shown the deviation of the last image to the starting point is not noticeable which implies that the relative distances are almost kept to a certain extent. The computation time was $t_{hybrid}$=136:28 s for the whole set of images, which is significantly less than the image based approach. The total error range (accuracy information) in the hybrid approach defines the search space in order to find the estimated position. By estimating the appropriate image position it is compensated for the total error (GPS and camera tilting errors). FIG. 3 helps to understand this concept better. It is searched inside this possible error range to find the best estimated position which maximizes the quality function best. The total error range used in FIG. 10a is GPS$_{error}$+tan($\alpha$)×height≅7 m in real world distance at the ground level, which is approximately equivalent to ¼ of the image width. Yet, in a complete nadir view, orthogonality will be reduced when getting away from the optical axis. Somehow it gives an idea that the middle parts of an images contain more reliable data. So for more pleasant result in the mosaicking (generation of the overview image), it may be made sure that the central part of each image under each picture-point is not masked by the border parts of other images. FIG. 11a shows the relation between correlation of the overlapping parts of two adjacent images in different approaches. As it can be seen, the hybrid approach shows the highest correlation comparing to the others. FIG. 11b indicates the relative distance from the estimated position to the corresponding GPS position on each image in the hybrid approach. By comparing these two graphs, it can be seen that if the estimated position of an image is close to its indicated GPS position it results in a higher correlation and vice versa. FIG. 10b shows a snapshot from a possible user interface. The operator defines the target area, then single images are placed iteratively over background map. The line shows the flight path of the UAV. Any kind of existing geo-referenced digital maps (e.g., from Google earth or Microsoft virtual earth) or an empty background can be used.

FIG. 10a shows an illustration of a mosaicking result of images taken from a roundtrip mission using the described concept, while FIG. 10b shows an illustration of a screen shot of a possible graphical user interface (GUI) of an unmanned aerial vehicle system. Captured images are incrementally stitched over the (partially outdated) background image.

Some embodiments according to the invention relate to a method for generating an overview image from a set of individual images or an incremental mosaicking of images from autonomous, small-scale unmanned aerial vehicles.

Unmanned aerial vehicles (UAVs) have been recently deployed in various civilian applications such as environmental monitoring, aerial imaging or surveillance. Small-scale UAVs are of special interest for first responders since they can rather easily provide bird's eye view images of disaster areas. As described above, a concept to mosaic an overview image of the area of interest given a set of individual images captured by UAVs flying at low altitude is proposed among others. The approach combines metadata-based and image-based stitching methods in order to overcome the challenges of low-altitude, small-scale UAV deployment such as non-nadir view, inaccurate sensor data, non-planar ground surfaces and limited computing and communication resources. For the generation of the overview image, geo-referencing is preserved as much as possible, since this is an important requirement, for example, for disaster management applications. The mosaicking method may be implemented on a UAV system and evaluated based on a quality metric.

Unmanned aerial vehicles (UAVs) are, for example, widely used in the military domain. Advances in technology, material science and control engineering made the development of small-scale UAVs possible and affordable. Such small-scale UAVs with a total weight of approximately 1 kg and a diameter of less than 1 m are getting prominent in civilian applications too and pose new research questions. These UAVs are equipped with sensors such as accelerometers, gyroscopes, and barometers to stabilize the flight attitude and GPS receivers to obtain accurate position information. Additionally, UAVs can carry payloads such as cameras, infrared cameras, or other sensors.

Thus, UAVs enable to obtain a bird's eye view of an area which is helpful in applications such as environmental monitoring, surveillance and law enforcement, and disaster assessment and disaster management (see for example "M. Quaritsch, E. Stojanovski, C. Bettstetter, G. Friedrich, H. Hellwagner, M. Hofbaur, M. Shah, and B. Rinner. Collaborative Microdrones: Applications and Research Challenges. In Proceedings of the Second International Conference on Autonomic Computing and Communication Systems (Autonomics 2008), page 7, Turin, Italy, September 2008"). Obviously, each application domain has different requirements. One goal is to support first responders in disaster assessment and disaster management since this is the most challenging application domain. In disaster situations such as earthquakes or flooding, first responders can not rely on a fixed infrastructure and the available information (e.g., maps) may no longer be valid. It is important to provide the first responders a quick and accurate overview of the affected area, typically spanning hundreds of thousands of square meters. This overview image may be refined (according to one aspect of the invention) and updated over time and can be augmented with additional information such as detected objects or the trajectory of moving objects. When covering large areas at reasonable resolution from such small-scale UAVs, the overview image needs to be generated from dozens of individual images. Moreover, a number of UAVs equipped with cameras may be employed instead of a single UAV to cope with the stringent time constraints and the limited flight time. The UAVs, flying at low altitudes of up to 100 m, provide images of the affected area which are stitched to an accurate overview image.

For example, a hybrid approach which allows to quickly mosaic the individual images and refine the alignment over time as more images are available was described above.

The hybrid approach for image mosaicking may take both the position information and the image data into account. The described mosaicking approach may be evaluated using a quality metric which is based on a spatial metric and a correlation metric.

For example, a method for generating an overview image ("mosaic") from a set of individual aerial images is described which have been captured from low altitudes. Position and orientation data from the aerial cameras may be exploited to generate a fast alignment of the individual images on the ground surface. Further, this alignment may be refined by applying different alignment procedures such as maximizing the pixel correlations within the image overlaps or exploiting estimated depth information to identify corresponding points at the same elevation level. On the one hand this method is able to provide a quick overview image which can be refined later on. On the other hand, it achieves a high geo-reference quality and reduces the processing time of the refinement process by limiting the search space through the preceding alignment steps.

In other words, the proposed concept may enable, for example, an online mosaicking method that increases the resulting geo-referencing accuracy incrementally. Online execution means that the mosaic is created while flying and continuously taking images. A first snapshot may be presented immediately—potentially with high geo-reference deviation and even from images without any overlap. By acquiring more images (with overlap), or computing the camera position and view (GPS and IMU) from the image data the accuracy of mosaicking and geo-referencing increases. In a target application the focus may lie on geo-referencing and projection accuracy instead of merging or fusing images to a nice looking panorama. An appealing fusion is optional later. But any waste or reduction of data by fusion may be considered as information about the scene (e.g. moving objects).

Further, small-scale quadrocopters with worse stability and device accuracy than planes (even small planes) but with big advantages in respect of the intended use case may be used (e.g. disaster recovery). They are easy to transport and to operate. Additionally, the approach may have a short feedback loop, determining uncovered or badly covered areas already during flight, due the mosaicking is done online. The UAVs can react immediately on changes.

In still other words, according to the described concept, a system for mosaicking high-resolution overview images of large areas with high geometric accuracy from a set of images taken from small-scale UAVs may be realized. This may take the use of small-scale UAVs flying at low altitude into account. A hybrid approach is described that combines inaccurate information on the camera's position and orientation, and the image data. Thus, it can maintain geometric accuracy and at the same time enhance the visual appearance. The evaluations show that the approach results in a higher correlation between overlapping image regions and retains spatial distances with an error of less than 30 cm. Further, the computation time for a set of 37 images may be reduced by approximately 70% compared to an image-based mosaicking. More dynamic and interactive methods of mosaicking images may be included to increase the quality of the overview image, i.e., as new images are taken the transformation of already mosaicked images are refined. Moreover, the proposed method may be applied also for larger areas and use images from multiple UAVs.

Figure 9:
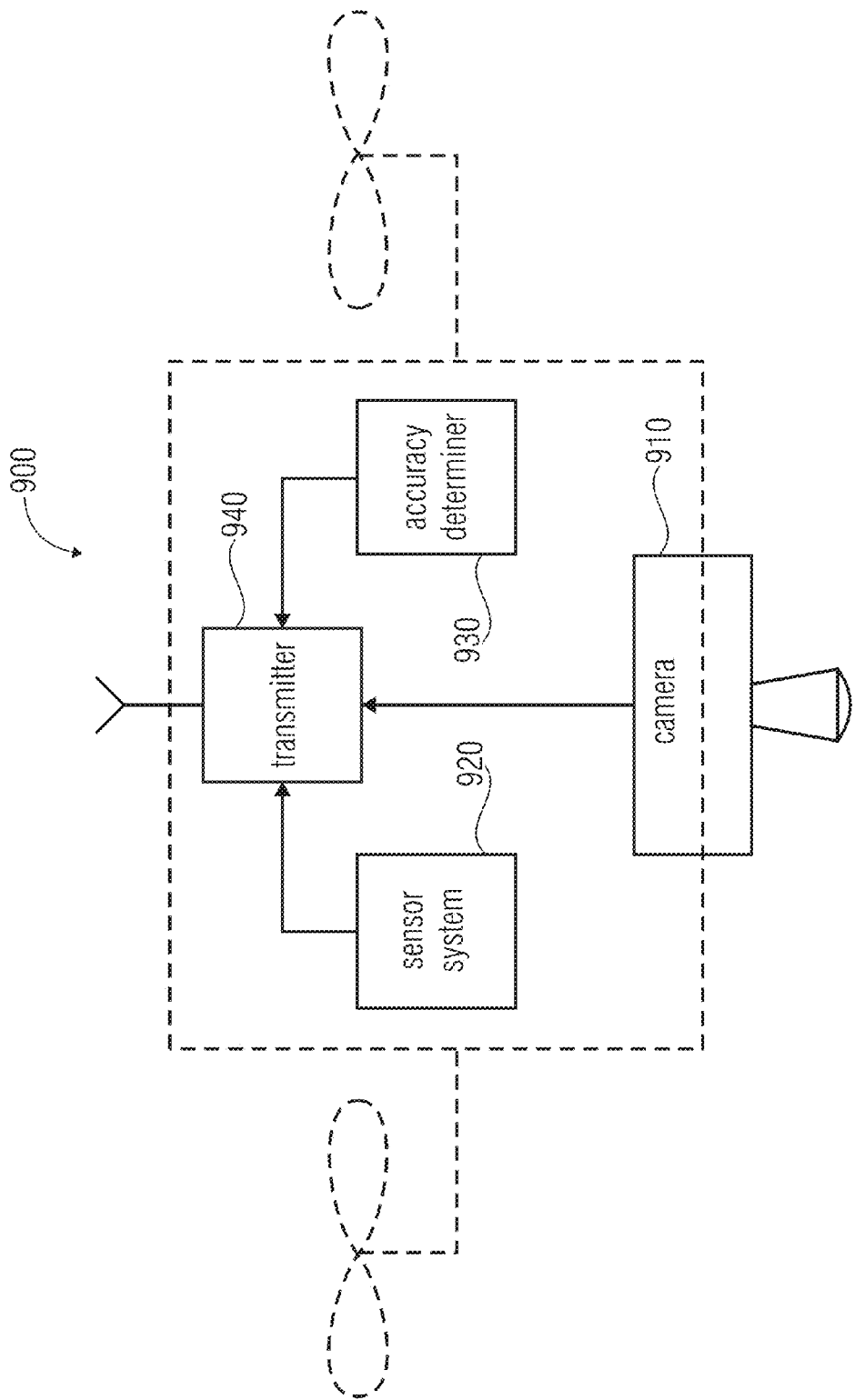
FIG. 9 is a block diagram of an unmanned aerial vehicle.

FIG. 9 shows a block diagram of an unmanned aerial vehicle 900 according to an embodiment of the invention. The unmanned aerial vehicle 900 comprises a camera 910, a sensor system 920, an accuracy determiner 930 and a transmitter 940. The camera 910, the sensor system 920 and the accuracy determiner 930 are connected to the transmitter 940. The camera 910 is able to take an image during a flight of the unmanned aerial vehicle 900. The sensor system 920 determines a position of the unmanned aerial vehicle 900 at the time, when the image is taken, to obtain a position information associated to the taken image. Further, the accuracy determiner 930 determines an accuracy of the determination of the position of the unmanned aerial vehicle 900 to obtain an accuracy information associated to the determined position information. The transmitter 940 transmits the taken image together with associated meta-data containing the position information of the taken image and the accuracy information of the position information.

By providing images with position information and accuracy information, an overview image may be generated according to the concept described above.

At the same time, the image is taken, means that the determination of the position and the accuracy information of the position may be triggered by taking an image. This may be done by a control unit. The position and the accuracy information may be determined at the same time, the image is taken, with a tolerance depending on the system implementation (e.g. within 1 s, 100 ms, 10 ms or less).

For example, the sensor system 920 receives a GPS signal (Global Positioning System Signal) and determines the position of the unmanned aerial vehicle 900 based on the GPS signal. Further, the accuracy determiner may determine the accuracy of the determination of the position also based on the received GPS signal.

The accuracy determiner 930 may store a determined accuracy of the determination of the position and provide this accuracy information for all taken images until the accuracy of the determination of the position changes more than a threshold.

The transmitter may be a wireless transmitter, so that taken images with associated meta-data may be transmitted during the flight of the unmanned aerial vehicle 900. Alternatively, the transmitter 940 may be a wire bound transmitter comprising a storage device for storing images and meta-data during the flight of the unmanned aerial vehicle 900. In this example, the taken images and the meta-data may be transmitted (e.g. to an apparatus for generating an overview image of a plurality of images) after the unmanned aerial vehicle 900 has landed.

The sensor system 920 may determine additionally a yaw, a nick and a roll of the unmanned aerial vehicle 900 at the time the image is taken to obtain a yaw information, a nick information and a roll information associated to the taken image. Further, the accuracy determiner 930 may determine an accuracy of the determination of the yaw, the nick and the roll of the unmanned aerial vehicle 900 to obtain an accuracy information associated to the determined yaw information, the nick information and the roll information. The transmitter 940 may transmit the taken image together with associated meta-data containing the position information, the yaw information, the nick information and the roll information of the taken image and the accuracy information of the position information, the yaw information, the nick information and the roll information.

Further, the sensor system 920 may determine one or more environmental parameters (e.g. wind force). This environmental parameter may be transmitted together with the other meta-data by the transmitter 940 or may be used by the accuracy determiner 930 to determine the accuracy of the determination of the position of the unmanned aerial vehicle 900 based on a determined environmental parameter. For example, if there is strong wind, the accuracy of the determination of the position may be lower than under weak wind conditions.

Some embodiments of the invention relate to a method for providing an image together with associated meta-data taken by an unmanned aerial vehicle. The method comprises taking an image during a flight of the unmanned aerial vehicle and determining a position of the unmanned aerial vehicle at a time the image is taken to obtain a position information associated to the taken image as well as determining a yaw, a nick or a roll of the unmanned aerial vehicle at a time, the image is taken, to obtain a yaw information, a nick information or a roll information associated to the taken image. Further, the method comprises determining an accuracy of the determination of the position of the unmanned aerial vehicle to obtain an accuracy information associated to the determined position information and determining an accuracy of the determination of the yaw, the nick or the roll of the unmanned aerial vehicle to obtain an accuracy information associated to the determined yaw information, the nick information or the roll information. Additionally, the method comprises transmitting the taken image together with associated meta-data containing the position information of the taken image and the accuracy information of the position information, wherein the meta-data further contains the yaw information, the nick information, the roll information, the accuracy information of the yaw information, the accuracy information of the nick information or the accuracy information of the roll information.

Although some aspects of the described concept have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An apparatus for generating an overview image of a plurality of images, wherein each image of the plurality of images comprises associated meta-data, the apparatus comprising:
   an image preprocessor configured to preprocess a new image by assigning the new image to a position in the overview image based on a position information comprised by the meta-data of the new image;
   a storage unit configured to store a plurality of preprocessed or processed images of the overview image, wherein each preprocessed or processed image of the plurality of preprocessed or processed images is assigned to a position in the overview image, wherein the storage unit is configured to provide the overview image containing the plurality of preprocessed or processed images at their assigned positions for displaying; and
   an image processor comprising an accuracy information input for receiving an accuracy information of the position information and a controllable processing engine, wherein the image processor is configured to determine an overlap region of the preprocessed new image and a stored preprocessed or stored processed image within the overview image based on the assigned position of the preprocessed new image and the assigned position of the stored preprocessed or stored processed image,
   wherein the controllable processing engine is configured to process the preprocessed new image by re-adjusting the assigned position of the preprocessed new image based on a comparison of features of the overlap region of the preprocessed image and features of the overlap region of the stored preprocessed or stored processed image, wherein the controllable processing engine is controlled by an accuracy information of the position information received by the accuracy information input, so that a maximal re-adjustment of the assigned position of the preprocessed new image is limited based on the received accuracy information of the position information,
   wherein the storage unit is configured to add the processed new image with the re-adjusted assigned position to the plurality of preprocessed or processed images, and
   wherein the image processor is configured to determine feature points of the preprocessed new image and configured to compare the determined feature points of the preprocessed new image with feature points of a stored processed image to identify common feature points and to obtain 3-dimensional positions of the common feature points, wherein the image processor is configured to determine common feature points located within a predefined maximum distance of relevance to a reference plane based on the 3-dimensional positions of the common feature points to identify relevant common feature points, wherein the image processor is configured to re-adjust the position of the preprocessed new image in the overview image based on a comparison of an image information of each relevant common feature point of the preprocessed new image with an image information of each corresponding relevant common feature point of the stored processed image without considering common feature points located beyond the predefined maximum distance of relevance to the reference plane.

2. The apparatus according to claim 1, wherein the image preprocessor is configured to preprocess the new image by correcting an orientation and a perspective distortion of the new image based on a roll information, a pitch information and a yaw information, wherein the roll information, the pitch information and the yaw information is comprised by the meta-data of the new image.

3. The apparatus according to claim 1, wherein the controllable processing engine is configured to process the preprocessed new image by re-adjusting the assigned position, an orientation or a perspective distortion of the preprocessed new image based on the comparison of the features of the overlap region, wherein the controllable processing engine is controlled by an accuracy information of a roll information, a pitch information or a yaw information received by the accuracy information input, so that the maximal re-adjustment of the assigned position of the processed new image, a maximal re-adjustment of the orientation or the perspective distortion of the preprocessed new image is limited based on the accuracy information of the roll information, the pitch information or the yaw information.

4. The apparatus according to claim 1, wherein the storage unit is configured to add the preprocessed new image with the assigned position to the plurality of preprocessed or processed images, and wherein the storage unit is configured to provide the overview image containing the preprocessed new image at the assigned position for displaying before the preprocessed new image is processed by the image processor.

5. The apparatus according to claim 4, wherein the storage unit is configured to add the processed new image by replacing the stored preprocessed new image by the processed new image, and wherein the storage unit is configured to provide the overview image containing the processed new image at the re-adjusted assigned position for displaying.

6. The apparatus according to claim 1, wherein the image preprocessor is configured to receive successively a plurality of new images and configured to preprocess each received new image, wherein the storage unit is configured to store each preprocessed new image and configured to provide an updated overview image after storing a predefined number of preprocessed new images.

7. The apparatus according to claim 1, comprising an unmanned aerial vehicle control unit configured to generate a control signal for piloting an unmanned aerial vehicle to a region corresponding to an area of the overview image being not covered by an image of the plurality of preprocessed or processed images.

8. The apparatus according to claim 1, wherein the image processor is configured to determine the reference plane based on the 3-dimensional positions of the common feature points.

9. The apparatus according to claim 1, wherein the storage unit is configured to add the new processed image together with the determined feature points of the new processed image to the plurality of preprocessed or processed images.

10. A method for generating an overview image of a plurality of images, wherein each image of the plurality of images comprises associated meta-data, the method comprising:
   preprocessing, by an image preprocessor, a new image by assigning the new image to a position in the overview image based on a position information comprised by the meta-data of the new image;
   storing, by a storage unit, a plurality of preprocessed or processed images of the overview image, wherein each preprocessed or processed image of the plurality of preprocessed or processed images comprises an assigned position in the overview image;
   determining, by an image processor, an overlap region of the preprocessed new image and a stored preprocessed or stored processed image within the overview image based on the assigned position of the preprocessed new image and the assigned position of the stored preprocessed or stored processed image;

processing, by a controllable processing engine, the preprocessed image by re-adjusting the assigned position of the preprocessed new image based on a comparison of features of the overlap region of the preprocessed new image and the stored preprocessed or stored processed image, wherein a maximal re-adjustment of the assigned position of the preprocessed new image is limited based on an accuracy information of the position information;

adding, by the storage unit, the processed new image with the re-adjusted assigned position to the plurality of preprocessed or processed images; and providing, by the storage unit, the overview image containing the plurality of preprocessed or processed images at their assigned positions for displaying, wherein processing the preprocessed image includes determining feature points of the preprocessed new image comparing the determined feature points of the preprocessed new image with feature points of a stored processed image to identify common feature points and to obtain 3-dimensional positions of the common feature points, determining common feature points located within a predefined maximum distance of relevance to a reference plane based on the 3-dimensional positions of the common feature points to identify relevant common feature points, and re-adjusting the position of the preprocessed new image in the overview image based on a comparison of an image information of each relevant common feature point of the preprocessed new image with an image information of each corresponding relevant common feature point of the stored processed image without considering common feature points located beyond the predefined maximum distance of relevance to the reference plane; and at least one of the image preprocessor, the storage unit, the image processor, and the controllable processing engine comprises a hardware implementation.

11. The method according to claim 10, further comprising:

adding the preprocessed new image to the plurality of preprocessed or processed images of the overview image;

displaying the overview image containing a preprocessed new image at the assigned position; and displaying the overview image containing the processed new image at the re-adjusted assigned position.

12. A non-transitory computer readable medium including a computer program with a program code for performing a method, when the computer program runs on a computer or micro controller, for generating an overview image of a plurality of images, wherein each image of the plurality of images comprises associated meta-data, said method comprising:

preprocessing a new image by assigning the new image to a position in the overview image based on a position information comprised by the meta-data of the new image;

storing a plurality of preprocessed or processed images of the overview image, wherein each preprocessed or processed image of the plurality of preprocessed or processed images comprises an assigned position in the overview image;

determining an overlap region of the preprocessed new image and a stored preprocessed or stored processed image within the overview image based on the assigned position of the preprocessed new image and the assigned position of the stored preprocessed or stored processed image;

processing the preprocessed image by re-adjusting the assigned position of the preprocessed new image based on a comparison of features of the overlap region of the preprocessed new image and the stored preprocessed or stored processed image, wherein a maximal re-adjustment of the assigned position of the preprocessed new image is limited based on an accuracy information of the position information;

adding the processed new image with the re-adjusted assigned position to the plurality of preprocessed or processed images; and providing the overview image containing the plurality of preprocessed or processed images at their assigned positions for displaying, wherein processing the preprocessed image includes determining feature points of the preprocessed new image comparing the determined feature points of the preprocessed new image with feature points of a stored processed image to identify common feature points and to obtain 3-dimensional positions of the common feature points, determining common feature points located within a predefined maximum distance of relevance to a reference plane based on the 3-dimensional positions of the common feature points to identify relevant common feature points, and re-adjusting the position of the preprocessed new image in the overview image based on a comparison of an image information of each relevant common feature point of the preprocessed new image with an image information of each corresponding relevant common feature point of the stored processed image without considering common feature points located beyond the predefined maximum distance of relevance to the reference plane.

\* \* \* \* \*